United States Patent
Peng et al.

(10) Patent No.: US 12,033,622 B1
(45) Date of Patent: *Jul. 9, 2024

(54) TARGET-DEVICE RESOLUTION

(71) Applicant: Amazon Technologies, Inc., Seattle, WA (US)

(72) Inventors: Lizhen Peng, Seattle, WA (US); Sven Eberhardt, Seattle, WA (US); Akshay Kumar, Seattle, WA (US); Charles Edwin Ashton Brett, Seattle, WA (US); Sara Parker Hillenmeyer, Seattle, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 563 days.

This patent is subject to a terminal disclaimer.

(21) Appl. No.: 17/163,695

(22) Filed: Feb. 1, 2021

Related U.S. Application Data

(63) Continuation of application No. 16/134,699, filed on Sep. 18, 2018, now Pat. No. 10,909,983.

(51) Int. Cl.
| | |
|---|---|
| *G10L 21/00* | (2013.01) |
| *G10L 15/18* | (2013.01) |
| *G10L 15/22* | (2006.01) |
| *G10L 25/00* | (2013.01) |

(52) U.S. Cl.
CPC .......... *G10L 15/22* (2013.01); *G10L 15/1815* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 9,520,129 B2* | 12/2016 | Nagatomo | G10L 15/22 |
| 10,157,042 B1 | 12/2018 | Jayakumar et al. | |
| 10,264,358 B2 | 4/2019 | Torok et al. | |
| 10,374,816 B1* | 8/2019 | Leblang | H04L 12/1822 |
| 10,425,780 B1 | 9/2019 | Devaraj et al. | |
| 10,431,217 B2 | 10/2019 | Torok et al. | |
| 10,546,583 B2 | 1/2020 | White et al. | |
| 10,623,246 B1 | 4/2020 | Iyer et al. | |
| 10,649,727 B1 | 5/2020 | Douglas et al. | |
| 10,674,001 B1 | 6/2020 | Rao et al. | |
| 10,685,669 B1 | 6/2020 | Lan et al. | |
| 10,747,894 B1 | 8/2020 | Cline et al. | |
| 10,904,027 B1* | 1/2021 | Basak | H04L 12/2829 |

(Continued)

OTHER PUBLICATIONS

Non Final Office Action dated Apr. 2, 2020 for U.S. Appl. No. 16/134,699 "Target-Device Resolution", Peng, 6 pages.

*Primary Examiner* — Satwant K Singh
(74) *Attorney, Agent, or Firm* — Lee & Hayes, P.C.

(57) ABSTRACT

Systems and methods for target-device resolution are disclosed. A user may speak a user utterance requesting an action to be performed with respect to an accessory device, such as a smart-home device. The user utterance may include an identifier for the accessory device, but that identifier may not correspond to a naming indicator of an accessory device and/or may correspond to multiple naming indicators. In these examples, one or more models are utilized to identify which accessory device is most likely to correspond to the accessory device targeted by the user utterance for operation.

20 Claims, 12 Drawing Sheets

(56) References Cited

U.S. PATENT DOCUMENTS

| | | | |
|---|---|---|---|
| 10,909,983 B1* | 2/2021 | Peng | G06F 18/254 |
| 11,258,671 B1* | 2/2022 | Vora | G10L 15/30 |
| 11,373,640 B1* | 6/2022 | Chen | H04L 41/145 |
| 11,374,780 B1* | 6/2022 | Basak | H04L 12/2829 |
| 2018/0233137 A1* | 8/2018 | Torok | G06F 3/167 |
| 2019/0238983 A1 | 8/2019 | Torok et al. | |
| 2019/0243606 A1 | 8/2019 | Jayakumar et al. | |
| 2019/0378499 A1 | 12/2019 | Miller et al. | |
| 2020/0090068 A1 | 3/2020 | Brett et al. | |
| 2020/0211554 A1 | 7/2020 | White et al. | |

* cited by examiner

TARGET-DEVICE RESOLUTION

RELATED APPLICATIONS

This application claims priority to and is a continuation of U.S. patent application Ser. No. 16/134,699, filed on Sep. 18, 2018, the entire contents of which are incorporated herein by reference.

BACKGROUND

Smart home devices have become ubiquitous. Users may control these devices, in some instances, using voice commands. The ability to increase flexibility of using voice commands to control devices may be desired. Described herein are improvements in technology and solutions to technical problems that can be used to, among other things, assist in controlling devices using voice commands.

BRIEF DESCRIPTION OF THE DRAWINGS

The detailed description is set forth below with reference to the accompanying figures In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
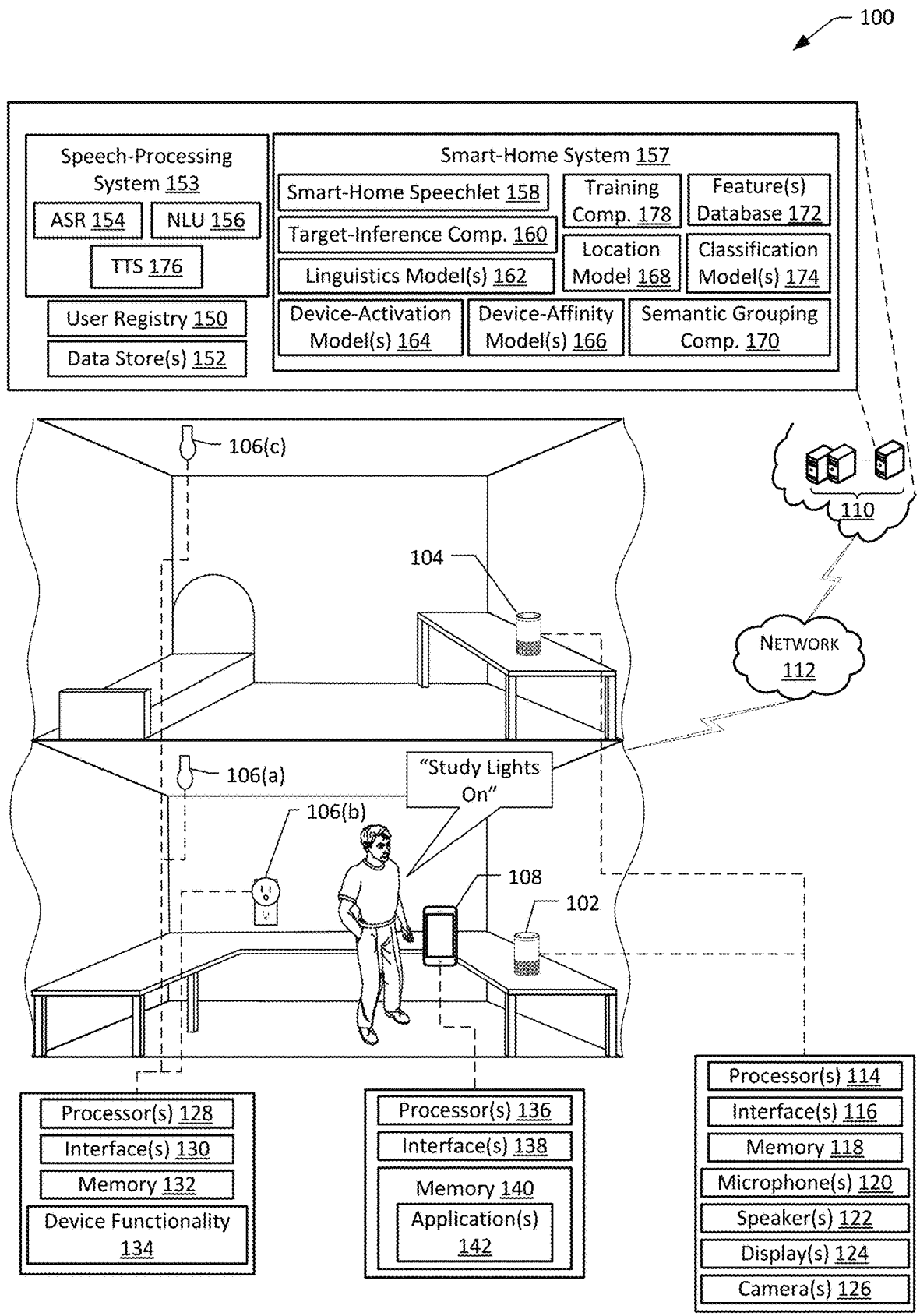
FIG. 1 illustrates a schematic diagram of an example environment for target-device resolution.

Systems and methods for target-device resolution are disclosed. Take, for example, a space, such as a home, that includes a voice-enabled device. A user located in the home may speak user utterances, such as commands, to the voice-enabled device, and the voice-enabled device and/or an associated remote system may cause actions to be performed based on the commands. Additionally, the home may include one or more smart accessory devices, such as light bulbs, plugs, locks, cameras, televisions, appliances, etc. The voice-enabled device may be configured to operate the accessory devices based on voice commands provided by the user. For example, the user may say "turn on Bedroom Light A." Microphones of the voice-enabled device may capture audio corresponding to this user utterance and may generate audio data. The audio data may be sent to a remote system for speech processing and the remote system may send directive data back to the voice-enabled device directing the voice-enabled device, or another device such as a hub device, to perform the action of causing an accessory device with the naming indicator of "Bedroom Light A" to be turned on.

In examples, the user utterance may include an identifier for the accessory device that is to be operated, but the identifier may not correspond to a naming indicator associated with an accessory device. For example, the identifier may be "study light," but no accessory device associated with the voice-enabled device has the naming indicator of "study light." In other examples, the identifier may correspond to multiple naming indicators associated with multiple accessory devices. For example, the identifier may be "the light," and multiple accessory devices have a naming indicator that includes "the light." In these and other examples, resolving which accessory device to operate may be desirable.

For example, a target-inference component of the remote system may receive data from one or more sources as input into one or more models for determining which target device should be acted upon in light of the identifier in the user utterance. The data may include, for example, naming indicators of the accessory devices associated with the voice-enabled device from which the audio data was received, device-state data indicating historical activation and deactivation of the accessory devices, utterance data indicating historical operation of the accessory devices by user utterances, prior-request data indicating which accessory devices were activated and/or deactivated recently, device-affinity data indicating frequencies at which accessory devices are controlled by voice-enabled devices, current device state indicating the state of accessory devices at or near the time the audio data is received, and/or the audio data received from the voice-enabled device.

The one or more models may be configured to utilize some or all of this data to generate features for input into a classification model, which may generate output data representing a ranked list of the accessory devices. For example, a linguistics model may utilize the identifier from the user utterance and the naming indicators of the accessory devices to determine semantic similarities for some or all identifier/naming indicator pairs. The features generated by the linguistics model may include semantic-similarity scores for some or all of the pairs, with the most favorable score being associated with the naming indicator that was determined by the linguistic model to be most semantically similar to the identifier from the user utterance. For example, with an identifier of "study light," a more favorable similarity score would be determined for the naming indicator "office light" than the naming indicator for "kitchen light" because "study" and "office" are more semantically similar than "study" and "kitchen." These features may be configured to be input include the classification model.

By way of further example, a device-activation model may utilize the device-state data and/or the utterance data to determine probabilities that the accessory devices are operated at the time when the audio data is received. A probability may be determined for some or all of the accessory devices associated with the voice-enabled device. The features generated by the device-activation model may include device-activation scores for some or all of the accessory devices, with the most favorable score being associated with the accessory device that is most frequently operated during the time and/or within a time range that includes the time. For example, it may be determined that at or near a certain time of the day and/or day of the week, say weekdays at 8:00 pm for example, the accessory device with the naming indicator of "bedroom light" is activated frequently. If audio data is received by the remote system at, for example, 8:01 pm, the device-activation model may determine that a higher probability exists that the "bedroom light" accessory device is the device to be acted upon rather than, for example, the "office light" accessory device, which is not operated, or is operated less frequently, at or around 8:00 pm. These features may be configured to be input include the classification model.

By way of further example, a device-affinity model may utilize the device-affinity data to determine frequencies at which accessory devices are operated by voice-enabled devices. For example, some accessory devices may be operated more frequently by one voice-enabled device over another voice-enabled device, such as accessory devices in a kitchen being operated more frequently by a voice-enabled device situated in the kitchen. A frequency and/or score indicating how frequent some or all of the accessory devices are utilized by some or all of the voice-enabled devices may be determined by the device-affinity model. The features generated by the device-affinity model may include device-affinity scores, with the most favorable score being associated with the accessory device that is most frequently operated by the voice-enabled device from which the audio data was received. These features may be configured to be input include the classification model.

By way of further example, a location model may utilize the identifier from the user utterance to determine if the identifier corresponds to an environment naming indicator, such as "kitchen," "office," and/or "living room," for example. The features generated by the location model may include confidence scores associated with the identifier corresponding to an environment naming indicator, with the most favorable score being associated with the environment naming indicator that most closely corresponds to the identifier.

Additionally, or alternatively, the remote system may be configured to utilize the prior-request data to generate features that include prior-request scores. For example, multiple accessory devices may be associated with a voice-enabled device, and the prior-request data may indicate a time at which a given accessory device was operated in response to a user utterance. The accessory device that was operated closest in time to when the audio data was received may be more likely to correspond to the target accessory device than other accessory devices. For example, a previous user utterance may have been "turn on Bedroom Light." Thereafter, another user utterance received 10 minutes later may be "turn off light." The prior-request data may indicate the time at which the Bedroom Light was turned on, and upon receiving the audio data corresponding to the user utterance of "turn off light," the remote system may determine, as a feature for input into the classification model, a prior-request score.

Additionally, or alternatively, the remote system may be configured to utilize the current device state to generate features that include device-state scores. For example, the accessory devices may be associated with states, such as "on," "off," "idle," "active," etc. A user utterance may include "turn off the light." In this example, the intent may be to deactivate or otherwise turn off an accessory device, but an identifier of the accessory device was not provided. However, only a portion or only one accessory device may be in a state that is "on" or similar, and this information can be used by the remote system to determine that other accessory devices that are already in an "off" state are not likely candidates for target-device resolution. Device-state scores may be determined by the remote system as features for input into the classification model.

Additionally, or alternatively, the remote system may utilize the identifier from the user utterance to determine semantic similarities and affinities to identify the accessory device most likely to correspond to the identifier, even in instances where the naming identifier for the accessory device has not been setup by the user and/or is associated with a default naming indicator, such as "light A," for example. For example, the user utterance may include "turn on cooking lights," but the voice-enabled device is not associated with an accessory device with the naming indicator of "cooking lights." The remote system may determine a semantic similarity between the word "cooking" and one or more words from naming indicators typically utilized for accessory devices. For example, the remote system may determine that "cooking" is semantically similar to "kitchen." The remote system may then determine similarities between the semantically-similar word, here "kitchen," and device-group naming indicators and/or naming indicators for voice-enabled devices.

For example, the user may have assigned or otherwise selected "kitchen" as a naming indicator for a device group that includes accessory devices located in the kitchen associated with the user, and/or the user may have assigned or otherwise selected "kitchen" as a naming indicator for the voice-enabled device. Additionally, or alternatively, usage data aggregated from use of voice-enabled devices in one or more other spaces may be utilized to determine that "cooking light" frequently refers to an accessory device with a "light" device type that is generally given a naming indicator with the word "kitchen." Some or all of this information may be utilized by the remote system to determine that the accessory device with the default naming indicator of "light A," which is associated with the "kitchen" device group, and/or is associated with the "kitchen" voice-enabled device, and/or that is associated with the usage data may be given the naming indicator "kitchen light," and may be acted upon given the user utterance of "turn on cooking light."

Based at least in part on the features as described herein, the classification model may determine which accessory devices are most likely to correspond to the accessory device intended to be acted upon. For example, the classification model may generate output data representing a ranked list of the accessory devices, with the highest-ranking accessory device being the most likely device to be acted upon. The target-inference component may provide the naming indicator and/or device identifier of the highest-ranking accessory device to one or more other components of the remote system to generate directive data. The directive data may represent a directive for the voice-enabled device and/or other components of the remote system to perform a directive, such as activation and/or deactivation, on the highest-ranking accessory device. Additionally, or alternatively, the remote system may generate audio data representing a request for the user of the voice-enabled device to confirm that the identified accessory device is the device the user intended for the system to act upon. Audio data representing the response of the user may be received at the remote system for processing, and if the response confirms that the accessory device was selected accurately by the remote system, the directive data may be sent to the voice-enabled device. Additionally, or alternatively, user responses to the target-device resolution processes described herein may be utilized by a training component to train the one or more models described herein and/or to generate new models to be utilized for target-device resolution.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for target-device resolution. The system 100 may include, for example, a first voice-enabled device 102 and a second voice-enabled device 104. The first voice-enabled device 102 and/or the second voice-enabled device 104 may be configured to receive user utterances and perform operations in response to such user utterances. In these examples, the first voice-enabled device 102 and/or the second voice-enabled device 104 may be "hands free" such that interactions with the devices are performed through audible requests and responses. The first voice-enabled device 102 may be located or otherwise situated in a first space. The second voice-enabled device 104 may be located or otherwise situated in a second space. As shown by way of example in FIG. 1, the first voice-enabled device 102 is located in an "office" while the second voice-enabled device 104 is located in a "bedroom." It should be understood that the devices may be located in spaces other than those specifically mentioned in this disclosure. It should also be understood that while the spaces depicted in FIG. 1 are rooms, the spaces may be any space.

The system 100 may also include one or more accessory devices 106(a)-106(c). The accessory devices 106(a)-(c) may be described as "smart" devices, which may have certain computing components and be configured to send and/or receive data from other devices. The accessory devices 106(a)-(c) may be, for example, light bulbs, plugs, locks, televisions, appliances, doorbells, cameras, etc. As shown in FIG. 1, the first space in which the first voice-enabled device 102 is situated may include a first accessory device 106(a), which may be a light bulb, and a second accessory device 106(b), which may be a plug. The accessory devices 106(a)-(c) may be "paired" or otherwise associated with the first voice-enabled device 102 and/or the second voice-enabled device 104. As such, the accessory devices 106(a)-(c) may be configured to send data to and/or receive data from the voice-enabled devices 102, 104. Likewise, the second space in which the second voice-enabled device 104 is situated may include a third accessory device 106(c), which may be a light bulb. The third accessory device 106(c) may be paired or otherwise associated with the voice-enabled devices 102, 104. The accessory devices 106(a)-(c) may be associated with naming indicators, which may be provided by a user of the accessory devices 106(a)-(c), the remote system 110, and/or one or more third-party systems.

The system 100 may also include a personal device 108, which may include a mobile device such as a mobile phone. The personal device 108 may be associated with the voice-enabled devices 102, 104 and/or the accessory device 106(a)-(c). In these examples, the personal device 108 may be configured to send data to and/or receive data from the voice-enabled devices 102, 104 and/or the accessory devices 106(a)-(c).

The first voice-enabled device 102, the second voice-enabled device 104, the accessory devices 106(a)-(c), and/or the personal device 108 may be configured to send data to and/or receive data from a remote system 110, such as via a network 112. In examples, one or more of the component of the system 100 may communicate directly with the remote system 110, via the network 112. In other examples, one or more of the accessory devices 106(a)-(c) may communicate with one or more of the voice-enabled devices 102, 104, and the voice-enabled devices 102, 104 may communicate with the remote system 110. Additionally, the personal device 108 may communicate directly with the voice-enabled devices 102, 104, the accessory devices 106(a)-(c), and/or the remote system 110. In further examples, a hub device, not shown in FIG. 1, may be utilized by the accessory devices 106(a)-(c) and/or the voice-enabled devices 102, 104 to send data to and/or receive data from other devices.

The first voice-enabled device 102 and/or the second voice-enabled device 104 may include one or more components, such as, for example, one or more processors 114, one or more network interfaces 116, memory 118, one or more microphones 120, one or more speakers 122, one or more displays 124, and/or one or more cameras 126. The microphones 120 may be configured to capture audio, such as user utterances, and generate corresponding audio data. The speakers 122 may be configured to output audio, such as audio corresponding to audio data received from another device and/or the remote system 110. The displays 124 may be configured to present images, such as images corresponding to image data received from another device and/or the remote system 110. The cameras 126 may be configured to capture images and to generate corresponding image data.

The accessory devices 106(a), 106(b), and/or 106(c) may include one or more components, such as, for example, one or more processors 128, one or more network interfaces 130, memory 132, and/or device functionality components 134. The memory 132 and/or processors 128 may be utilized to cause certain operations to be performed by the accessory devices 106(a)-(c), such as activating and/or deactivating the device functionality components 134. The device functionality components 134 may include components associated with the intended use of the accessory devices 106(a)-(c). For example, the first accessory device 106(a) may be a light bulb, and in this example, the device functionality components 134 may include a filament and/or light emitting diode that may produce and/or emit light. By way of further example, the second accessory device 106(b) may be a wall plug, and in this example, the device functionality components 134 may include an "on/off mechanism" for causing electricity to flow or not flow to a device that is plugged in to the wall plug. It should be noted that the device functionality components 134 illustrated here are by way of example only.

The personal device 108 may include one or more components such as, for example, one or more processors 136, one or more network interfaces 138, and memory 140. The memory 140 may include one or more components, such as, for example, one or more applications 142. The applications 142 may reside on the memory 140 of the personal device 108 and/or the applications 142 may reside elsewhere, such as with the remote system 110, and may be accessible via the personal device 108. The applications 142 may be configured to cause the processors 136 to display one or more user interfaces associated with operations of the voice-enabled devices 102, 104 and/or the accessory devices 106(*a*)-(*c*). The user interfaces may be utilized to receive inputs from the user of the personal device 108 and/or to provide content to the user.

The remote system 110 may include components such as, for example, a user registry 150, one or more data stores 152, a speech-processing system 153, and/or a smart-home system 157. The speech-processing system 153 may include an automatic speech recognition (ASR) component 154, a natural language understanding (NLU) component 156, and/or a text-to-speech (TTS) component 176. The smart-home system 157 may include a smart-home speechlet 158, a target-inference component 160, one or more linguistics models 162, one or more device-activation models 164, one or more device-affinity models 166, a location model 168, a semantic grouping component 170, a feature(s) database 172, one or more classification models 174, and/or a training component 178. Each of the components described herein with respect to the remote system 110 may be associated with their own systems, which collectively may be referred to herein as the remote system 110, and/or some or all of the components may be associated with a single system. In examples, some or each of the components of the remote system 110 may include their own processor(s), network interface(s), and/or memory. As such, by way of example, the speech-processing system 153 may include and/or be associated with processor(s), network interface(s), and/or memory. The smart-home system 157 may include and/or be associated with different processor(s), network interface(s), and/or memory, or one or more of these components may utilize some or all of the same processor(s), network interface(s), and/or memory utilized by the speech-processing system 153. These components are described in detail below. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 150 may be configured to identify, determine, and/or generate associations between users, user accounts, and/or devices. For example, one or more associations between user profiles and user accounts may be identified, determined, and/or generated by the user registry 150. The user registry 150 may additionally store information indicating one or more applications and/or resources accessible to and/or enabled for a given user account. Additionally, the user registry 150 may include information indicating device identifiers, such as naming identifiers, associated with a given user account, as well as device types associated with the device identifiers. The user registry 150 may also include information indicating user account identifiers, naming indicators of devices associated with user accounts, and/or associations between voice-enabled devices 102, 104 and accessory devices 106(*a*)-(*c*). It should also be understood that the terms "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores 152 may be configured to identify, determine, and/or generate data associated with use of the voice-enabled devices 102, 104 and/or the accessory devices 106(*a*)-(*c*). For example, the voice-enabled devices 102, 104 may be utilized to cause the accessory devices 106(*a*)-(*c*) to operate. Usage data may be identified, determined, and/or generated that indicates some or each of these interactions. Timing data may also be identified, determined, and/or generated that indicates a time at which some or each of these interactions took place. Device-state data, prior-request data, and/or other usage data may also be identified, determined, and/or generated. It should be understood that while the user registry 150 and the data stores 152 are illustrated as separate components, the user registry 150 and the data stores 152 may be the same component.

The remaining components of the remote system 110 that are illustrated in FIG. 1 will be described below by way of an example use case. It should be noted that this use case is provided for illustrative purposes, and not by way of limitation. For example, a user may speak a user utterance of "turn on study lights." The microphones 120 of the voice-enabled device 102 may capture audio corresponding to the user utterance and may generated audio data. The audio data may be sent, via the network 112, to the speech-processing system 153 for speech processing. The ASR component 154 may generate, based at least in part on the audio data, corresponding text data representing the text "turn on study lights." The NLU component 156 may generate, based at least in part on the text data, corresponding intent data indicating that the user utterance corresponds to a "turn on" intent and the device to be acted upon, otherwise described herein as the payload, is associated with the identifier "study lights." The ASR component 154 and the NLU component 156 are described in more detail below with respect to FIG. 10. The "turn on" intent may be associated with intents assigned to and/or otherwise associated with the smart-home system 157.

The smart-home speechlet 158 of the smart-home system 157 may be configured to receive some or all of the intent data and attempt to determine which accessory device 106(*a*)-(*c*) is associated with the "study lights" identifier. The smart-home speechlet 158, and/or another component of the remote system 110, may determine whether the identifier corresponds to one or more naming indicators associated with the accessory devices 106(*a*)-(*c*). In the examples used herein, the identifier may not correspond to a naming indicator and/or the identifier may correspond to more than one naming indicator. In these and other examples, the remote system 110 may perform target-device resolution to determine which accessory device to "turn on."

For example, the smart-home speechlet 158 may call or otherwise request the target-inference component 160 to perform the target-device resolution. The target-inference component 160 may utilize data stored in the user registry 150 and/or the data stores 152 and/or from the audio data representing the user utterance along with one or more models to determine which accessory device 106(a)-(c) should be acted upon. For example, the target-inference component 160 of the remote system 110 may receive data from one or more sources as input into the classification model(s) 174 for determining which target device should be acted upon in light of the identifier in the user utterance. The data may include, for example, naming indicators of the accessory devices 106(a)-(c) associated with the voice-enabled device 102, 104 from which the audio data was received, device-state data indicating historical activation and deactivation of the accessory devices 106(a)-(c), utterance data indicating historical operation of the accessory devices 106(a)-(c) by user utterances, prior-request data indicating which accessory devices 106(a)-(c) were activated and/or deactivated recently, device-affinity data indicating frequencies at which accessory devices 106(a)-(c) are controlled by voice-enabled devices 102, 104, current device state indicating the state of accessory devices at or near the time the audio data is received, and/or the audio data received from the voice-enabled device 102, 104.

The one or more models may be configured to utilize some or all of this data to generate features for input into the classification model 174. The ranking component 176 may generate output data representing a ranked list of the accessory devices 106(a)-(c). For example, the linguistics model(s) 162 may utilize the identifier from the user utterance and the naming indicators of the accessory devices 106(a)-(c) to determine semantic similarities for some or all identifier/naming indicator pairs. The features generated by the linguistics model(s) 162 may include semantic-similarity scores for some or all of the pairs, with the most favorable score being associated with the naming indicator that was determined by the linguistic model(s) 162 to be most semantically similar to the identifier from the user utterance. For example, with an identifier of "study light," a more favorable similarity score would be determined for the naming indicator "office light" than the naming indicator for "kitchen light" because "study" and "office" are more semantically similar than "study" and "kitchen." These features may be configured to be input include the classification model(s) 174 and/or may be stored in the feature(s) database 172 for use by the classification model(s) 174.

As to the linguistics model(s) 162, machine learning techniques may be utilized to generate models that extract and/or utilize extracted naming indicators associated with the accessory devices 106(a)-(c) and calculate semantic similarities between the naming indictors and the identifier from the user utterance. A device pair may be identified, determined, and/or generated for each pair of identifier and accessory device 106(a)-(c). For example, a first pair may correspond to the first accessory device 106(a) and the identifier; a second pair may correspond to the second accessory device 106(b) and the identifier; and a third pair may correspond to the third accessory device 106(c) and the identifier. The naming indicators associated with the accessory devices 106(a)-(c) may be analyzed with respect to the identifier, using the linguistics model(s) 162, to determine a probability score for each pair.

In addition to, or instead of, using the linguistics model(s) 162, the remote system 110 may utilize the device-activation model(s) 164 to perform target-device resolution. By way of example, the device-activation model(s) 164 may utilize the device-state data and/or the utterance data to determine probabilities that the accessory devices 106 (a)-(c) are operated at the time when the audio data is received. A probability may be determined for some or all of the accessory devices 106(a)-(c) associated with the voice-enabled device 102, 104. The features generated by the device-activation model(s) 164 may include device-activation scores for some or all of the accessory devices 106(a)-(c), with the most favorable score being associated with the accessory device 106(a)-(c) that is most frequently operated during the time and/or within a time range that includes the time at which the audio data was received.

For example, it may be determined that at or near a certain time of the day and/or day of the week, such as weekdays at 2:00 pm for example, the accessory device 106(a) with the naming indicator of "office light" is activated frequently. If audio data is received by the remote system 110 at, for example, 2:04 pm, the device-activation model(s) 164 may determine that a higher probability exists that the "office light" accessory device 106(a) is the device to be acted upon rather than, for example, the "bedroom light" accessory device 106(c), which is operated less frequently at or around 2:00 pm. These features may be configured to be input include the classification model(s) 174 and/or may be stored in the feature(s) database 172 for use by the classification model(s) 174.

As to the device-activation models 164, rules-based and/or machine learning techniques may be utilized to generate models that extract and/or utilize timing information associated with when an accessory device 106(a)-(c) is turned on and/or turned off. The device-activation models 164 may be configured to receive timing data from the user registry 150 and/or the data stores 152. The timing data may be utilized to determine when accessory devices 106(a)-(c) are turned on and/or turned off. A threshold degree of usage similarity may be identified and/or determined and may be utilized to analyze whether a given device has a usage frequency that meets or exceeds the threshold degree of usage similarity.

In addition to, or instead of, using the linguistics model(s) 162 and/or the device-activation model(s) 164, the remote system 110 may utilize the device-affinity model(s) 166 to perform target-device resolution. By way of example, a device-affinity model(s) 166 may utilize the device-affinity data to determine frequencies at which accessory devices 106(a)-(c) are operated by voice-enabled devices 102, 104. For example, some accessory devices 106(a)-(c) may be operated more frequently by one voice-enabled device 102 over another voice-enabled device 104, such as accessory devices 106(a)-(b) in an office being operated more frequently by a voice-enabled device 102 situated in the office. A frequency and/or score indicating how frequent some or all of the accessory devices 106(a)-(c) are utilized by some or all of the voice-enabled devices 102, 104 may be determined by the device-affinity model(s) 166. The features generated by the device-affinity model(s) 166 may include device-affinity scores, with the most favorable score being associated with the accessory device 106(a)-(c) that is most frequently operated by the voice-enabled device 102, 104 from which the audio data was received. These features may be configured to be input include the classification model(s) 174 and/or may be stored in the feature(s) database 172 for use by the classification model(s) 174.

As to the device-affinity model(s) 166, rules-based and/or machine learning techniques may be utilized to generate models that extract and/or utilize device affinity information associated with a frequency at which an accessory device 106(a)-(c) is caused to operate by given voice-enabled devices 102, 104. For example, the space may include two or more voice-enabled devices 102 and 104, say one in an office and one in a bedroom. The office voice-enabled device 102 may be frequently utilized to operate certain accessory devices, such as, for example, the first accessory device 106(a) and the second accessory device 106(b). The bedroom voice-enabled device 104 may be frequently utilized to operate other accessory devices, such as, for example, the third accessory device 106(c) and another accessory device such as a door lock, a security system, etc. The device-affinity model(s) 166 may determine a frequency at which such voice-enabled devices 102 and 104 are utilized to operate the accessory devices 106(a)-(c). By way of example, device-affinity data may be stored in the user registry 150 and/or the data stores 152 and may be received by the device-affinity model(s) 166 for identifying which accessory devices 106(a)-(c) are operated by which voice-enabled devices 102, 104 and frequencies associated with such operations.

By way of example, a control rate may be identified for each pair of voice-enabled device and accessory device. In the example used in FIG. 1, a control rate may be determined for the interactions between some or each accessory device 106(a)-(c) and some or each voice-enabled device 102, 104. For example, a control rate of 0.9 may be determined for the interaction of the first accessory device 106(a) with the first voice-enabled device 102. A control rate of 0.1 may be determined for the interaction of the first accessory device 106(a) with the second voice-enabled device 104. Likewise, a control rate of 0.8 may be determined for the interaction of the second accessory device 106(b) with the first voice-enabled device 102, while a control rate of 0.2 may be determined for the interaction of the second accessory device 106(b) with the second voice-enabled device 104. In this example, the device-affinity model(s) 160 may determine that the first accessory device 106(a) and the second accessory device 106(b) are frequently controlled by the first voice-enabled device 102, making those accessory devices 106(a)-(b) candidates for target-device resolution when the audio data is received from the first voice-enabled device 102. In examples, a threshold control rate may be established and may be utilized to determine if an accessory device 106(a)-(c) is controlled by a particular voice-enabled device 102, 104 with enough frequency to make the accessory device 106(a)-(c) a candidate for target-device resolution.

In addition to, or instead of, using the linguistics model(s) 162 and/or the device-activation model(s) 164 and/or the device-affinity model(s) 166, the remote system 110 may utilize the location model 168 to perform target-device resolution. By way of example, the location model 168 may utilize the identifier from the user utterance to determine if the identifier corresponds to an environment naming indicator, such as "kitchen," "office," and/or "living room," for example. The features generated by the location model 168 may include confidence scores associated with the identifier corresponding to an environment naming indicator, with the most favorable score being associated with the environment naming indicator that most closely corresponds to the identifier. By way of example, if the user utterance includes "turn on the kitchen lights." The location model 168 may identify "kitchen" as an environment naming indicator and may utilize that information to determine which accessory device 106(a)-(c) associated with the "kitchen" and/or with a naming indicator of "kitchen" is most likely to correspond to "kitchen lights" from the user utterance. Additionally, or alternatively, the location model 168 may be configured to receive weather data indicating weather conditions at or near a location where the voice-enabled device 102 and/or the accessory devices 106(a)-(c) situated. The weather data may be utilized to determine, for example, lighting conditions at the location and/or within a given space. For example, in instances where the weather data indicates that it is currently sunny and 95 degrees at the location, it may be less likely that the user utterance corresponds to a request to turn on lights in a living room area. By way of further example, in stances where the weather data indicates that it is currently cloudy and/or rainy, it may be more likely that the user utterance corresponds to a request to turn on lights in a living room area.

Additionally, or alternatively, the remote system 110 may be configured to utilize the prior-request data to generate features that include prior-request scores. For example, multiple accessory devices 106(a)-(c) may be associated with a voice-enabled device 102, 104, and the prior-request data may indicate a time at which a given accessory device 106(a)-(c) was operated in response to a user utterance. The accessory device 106(a)-(c) that was operated closest in time to when the audio data was received may be more likely to correspond to the target accessory device than other accessory devices 106(a)-(c). For example, a previous user utterance may have been "turn on Bedroom Light." Thereafter, another user utterance received 10 minutes later may be "turn off light." The prior-request data may indicate the time at which the Bedroom Light was turned on, and upon receiving the audio data corresponding to the user utterance of "turn off light," the remote system 110 may determine, as a feature for input into the classification model(s) 174, a prior-request score.

Additionally, or alternatively, the remote system 110 may be configured to utilize the current device state to generate features that include device-state scores. For example, the accessory devices 106(a)-(c) may be associated with states, such as "on," "off," "idle," "active," etc. A user utterance may include "turn off the light." In this example, the intent may be to deactivate or otherwise turn off an accessory device 106(a)-(c), but an identifier of the accessory device 106(a)-(c) was not provided. However, only a portion or only one accessory device 106(a)-(c) may be in a state that is "on" or similar, and this information can be used by the remote system 110 to determine that other accessory devices 106(a)-(c) that are already in an "off" state are not likely candidates for target-device resolution. Device-state scores may be determined by the remote system 110 as features for input into the classification model(s) 174.

Additionally, or alternatively, the semantic grouping component 170 may be configured to utilize the identifier from the user utterance to determine semantic similarities and affinities to identify the accessory device 106(a)-(c) most likely to correspond to the identifier, even in instances where the naming identifier for the accessory device 106(a)-(c) has not been setup by the user and/or is associated with a default naming indicator, such as "light A," for example. For example, the user utterance may include "turn on cooking lights," but the voice-enabled device 102, 104 is not associated with an accessory device 106(a)-(c) with the naming indicator of "cooking lights." The semantic grouping component 170 may determine a semantic similarity between the word "cooking" and one or more words from naming indicators typically utilized for accessory devices 106(a)-(c). For example, the remote system 110 may determine that "cooking" is semantically similar to "kitchen." The remote system 110 may then determine similarities between the semantically-similar word, here "kitchen," and device-group naming indicators and/or naming indicators for voice-enabled devices 102, 104.

For example, the user may have assigned or otherwise selected "kitchen" as a naming indicator for a device group that includes accessory devices 106(a)-(c) located in the kitchen associated with the user, and/or the user may have assigned or otherwise selected "kitchen" as a naming indicator for the voice-enabled device 102, 104. Additionally, or alternatively, usage data aggregated from use of voice-enabled devices 102, 104 in one or more other spaces may be utilized to determine that "cooking light" frequently refers to an accessory device 106(a)-(c) with a "light" device type that is generally given a naming indicator with the word "kitchen." Some or all of this information may be utilized by the semantic grouping component 170 to determine that the accessory device 106(a)-(c) with the default naming indicator of "light A," which is associated with the "kitchen" device group, and/or is associated with the "kitchen" voice-enabled device 102, 104, and/or that is associated with the usage data may be given the naming indicator "kitchen light," and may be acted upon given the user utterance of "turn on cooking light."

The features generated by the linguistics model(s) 162, the device-activation model(s) 164, the device-affinity model(s) 166, the location model 168, and/or the semantic grouping component 170 may be stored, in examples, in a feature(s) database 172 and may be retrieved by the classification model(s) 174 to perform target-device resolution. For example, the device-affinity scores may be predetermined before the audio data is received by the remote system 110, and the corresponding features may be stored in the feature(s) database 172.

In examples, the target-inference component 160 may be unable to determine which accessory device should be acted upon in light of the user utterance and/or may be able to determine which accessory device should be acted upon below a threshold confidence level. In these and other examples, the process may default to identifying the accessory device using Levenshtein distances. Levenshtein distances may include a string metric for measuring the distance between two sequences. For example, the Levenshtein distance between two words is the minimum number of single-character edits required to change one word into the other. These techniques may be utilized to determine the Levenshtein distance between an identifier from the user utterance and naming indicators associated with the accessory devices, with the shortest Levenshtein distance indicating the naming indicator to be selected by the system.

Based at least in part on the features as described herein, the classification model(s) 174 may determine which accessory devices 106(a)-(c) are most likely to correspond to the accessory device intended to be acted upon. For example, the classification model(s) 174 may generate output data representing a ranked list of the accessory devices 106(a)-(c), with the highest-ranking accessory device being the most likely device to be acted upon. The target-inference component 160 may provide the naming indicator and/or device identifier of the highest-ranking accessory device to the smart-home speechlet 158, for example, to generate directive data. The directive data may represent a directive for the voice-enabled device 102, 104 and/or other components of the remote system 110 to perform a directive, such as activation and/or deactivation, on the highest-ranking accessory device. Additionally, or alternatively, the TTS component 176 may generate audio data representing a request for the user of the voice-enabled device 102, 104 to confirm that the identified accessory device is the device the user intended for the system 110 to act upon. Audio data representing the response of the user may be received at the remote system 110 for processing, and if the response confirms that the accessory device 106(a)-(c) was selected accurately by the remote system 110, the directive data may be sent to the voice-enabled device 102.

Additionally, or alternatively, user responses to the target-device resolution processes described herein may be utilized by the training component 178 to train the one or more models described herein and/or to generate new models to be utilized for target-device resolution. The training component 178 may receive feedback data representing an indication that the target device corresponds to a given accessory device 106(a)-(c) and may generate, based at least in part on the feedback data, training data representing the indication as a target attribute. The training component 178 may determine an association between the target attribute and at least one of the features or at least a portion of the intent data as generated by the NLU component 156, and may generate, based at least in part on the association, a new classification model to be utilized in place of the previous classification model 174.

The speechlet(s) described herein may include a speech-enabled web component that may run in the remote system 110. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 114, 128, 136, and/or 144, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 128, 136, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 128, 136, and/or the processor(s) described with respect to the components of the remote system 110 may possess its own local memory, which also may store program components, program data, and/or one or more operating systems.

The memory 118, 132, 140, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 132, 140, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 132, 140, and/or the memory described with respect to the components of the remote system 110 may be implemented as computer-readable storage media ("CRSM"), which may be any available physical media accessible by the processor(s) 114, 126, 136, and/or the processor(s) described with respect to the components of the remote system 110 to execute instructions stored on the memory 118, 132, 140, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118, 132, 140, and/or the memory described with respect to the components of the remote system 110, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 116, 130, 138, and/or the network interface(s) described with respect to the components of the remote system 110 may enable messages between the components and/or devices shown in system 100 and/or with one or more other remote systems, as well as other networked devices. Such network interface(s) 116, 130, 138, and/or the network interface(s) described with respect to the components of the remote system 110 may include one or more network interface controllers (NICs) or other types of transceiver devices to send and receive messages over the network 112.

For instance, each of the network interface(s) 116, 130, 138, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 130, 138, and/or the network interface(s) described with respect to the components of the remote system 110 may include a wide area network (WAN) component to enable message over a wide area network.

In some instances, the remote system 110 may be local to a space associated the first voice-enabled device 102 and/or the second voice-enabled device 104. For instance, the remote system 110 may be located within the first voice-enabled device 102 and/or the second voice-enabled device 104. In some instances, some or all of the functionality of the remote system 110 may be performed by the first voice-enabled device 102 and/or the second voice-enabled device 104. Also, while various components of the remote system 110 have been labeled and named in this disclosure and each component has been described as being configured to cause the processor(s) 144 to perform certain operations, it should be understood that the described operations may be performed by some or all of the components and/or other components not specifically illustrated.

Figure 2:
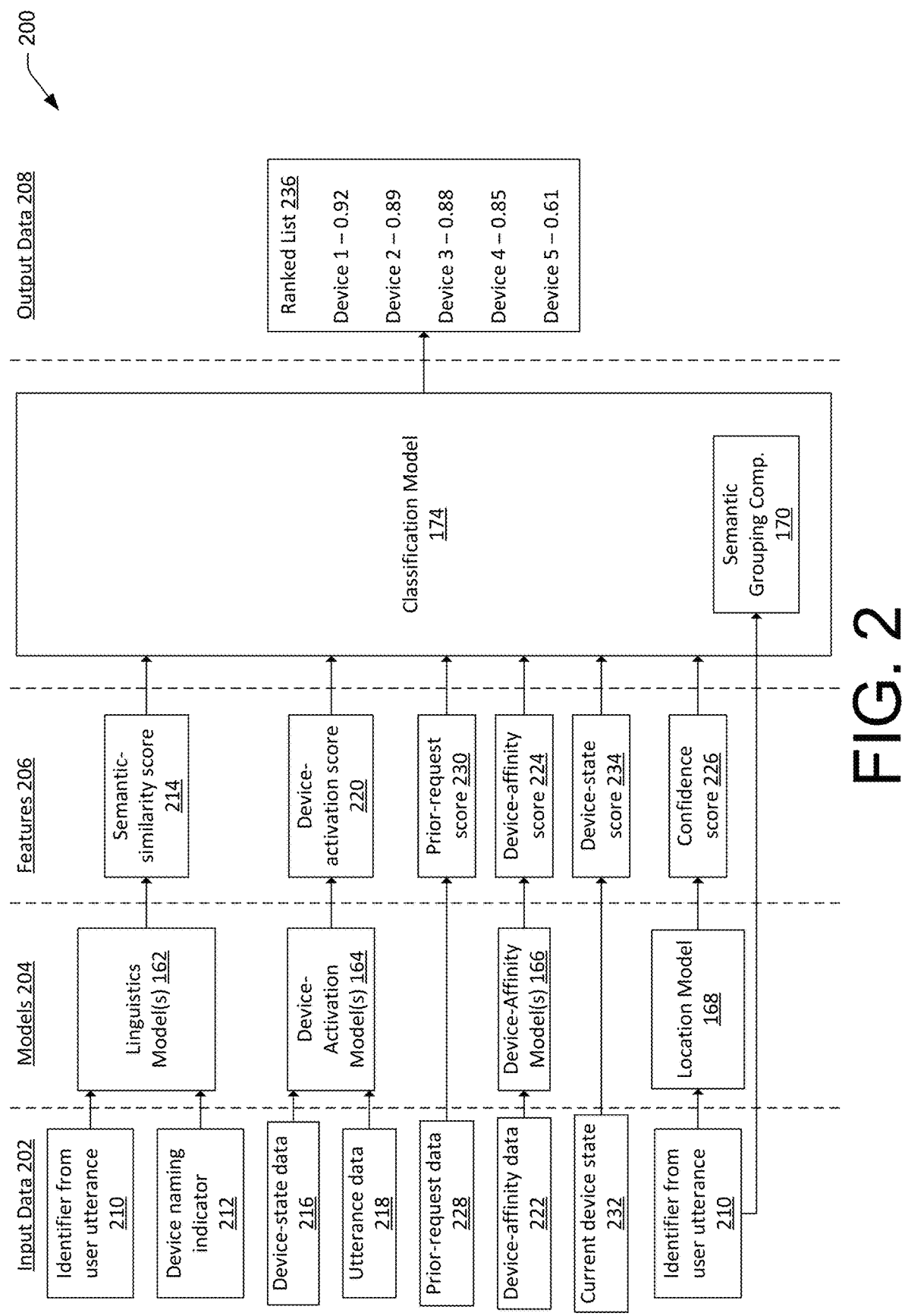
FIG. 2 illustrates a conceptual diagram of components of a system for target-device resolution and data used by the system.

FIG. 2 illustrates a conceptual diagram of components of a system 200 for target-device resolution and data used by the system 200. FIG. 2 illustrates what data may be utilized and which components of a system, such as the remote system 110 from FIG. 1, may utilize such data. For example, the system 200 may include input data 202, models 204, features 206 generated by the models 204, a classification model 174 that may utilize the features 206, and output data 208 that may be generated by the classification model 174. The models 204 may include linguistics model(s) 162, device-activation model(s) 164, device-affinity models 166, and/or a location model 168. Each of these models 204 may utilize input data 202 as described herein.

For example, the linguistics model(s) 162 may utilize the identifier 210 from the user utterance. As described above, intent data generated by an NLU component of the remote system 110 may include an identifier 210 from the user utterance. In the example of a user utterance of "turn on study lights," the identifier 210 may include "study lights" as the identifier of the accessory device to be operated. Additionally, the linguistics model(s) 162 may utilize device naming indicators 212 associated with accessory devices. For example, during setup of accessory devices, a user, the remote system 110, and/or a third-party system may associate a device naming indicator 212 with an accessory device. The device naming indicator 212 may be updated and/or changed periodically as well. The device naming indicator 212 may be stored, for example, in association with a user registry associated with the accessory device and/or an associated voice-enabled device.

The linguistics model(s) 162 may utilize the identifier 210 from the user utterance and the naming indicators 212 of the accessory devices to determine semantic similarities for some or all identifier/naming indicator pairs. The features 206 generated by the linguistics model(s) 162 may include semantic-similarity scores 214 for some or all of the pairs, with the most favorable score 214 being associated with the naming indicator 212 that was determined by the linguistic model(s) 162 to be most semantically similar to the identifier 210 from the user utterance. For example, with an identifier 210 of "study light," a more favorable similarity score 214 would be determined for the naming indicator 212 "office light" than the naming indicator 212 for "kitchen light" because "study" and "office" are more semantically similar than "study" and "kitchen." These features 214 may be configured to be input into the classification model(s) 174 and/or may be stored in a feature(s) database for use by the classification model(s) 174.

Additionally, or alternatively, the device-activation model(s) 164 may utilize the device-state data 216 and/or the utterance data 218 as stored, for example, in a data store associated with the remote system 110. For example, the device-state data 216 may indicate historical activation and deactivation of the accessory devices, and the utterance data 218 may indicate historical operation of the accessory devices by user utterances.

The device-activation model(s) 164 may utilize the device-state data 216 and/or the utterance data 218 to determine probabilities that the accessory devices are operated at the time when the audio data is received. A probability may be determined for some or all of the accessory devices associated with the voice-enabled device. The features 206 generated by the device-activation model(s) 164 may include device-activation scores 220 for some or all of the accessory devices, with the most favorable score 220 being associated with the accessory device that is most frequently operated during the time and/or within a time range that includes the time at which the audio data was received.

For example, it may be determined that at or near a certain time of the day and/or day of the week, such as weekdays at 2:00 pm for example, an accessory device with the naming indicator of "office light" is activated frequently. If audio data is received by the remote system 110 at, for example, 2:04 pm, the device-activation model(s) 164 may determine that a higher probability exists that the "office light" accessory device is the device to be acted upon rather than, for example, the "bedroom light" accessory device, which is operated less frequently at or around 2:00 pm. These features 206 may be configured to be input into the classification model(s) 174 and/or may be stored in the feature(s) database for use by the classification model(s) 174.

Additionally, or alternatively, the device-affinity model(s) 166 may utilize device-affinity data 222 as stored, for example, in association with the data store. The device-affinity data 222 may indicate frequencies at which accessory devices are controlled by voice-enabled devices. For example, some accessory devices may be operated more frequently by one voice-enabled device over another voice-enabled device, such as accessory devices in an office being operated more frequently by a voice-enabled device situated in the office. A frequency and/or score indicating how frequent some or all of the accessory devices are utilized by some or all of the voice-enabled devices may be determined by the device-affinity model(s) 166. The features 206 generated by the device-affinity model(s) 166 may include device-affinity scores 224, with the most favorable score 224 being associated with the accessory device that is most frequently operated by the voice-enabled device from which the audio data was received. These features may be configured to be input into the classification model(s) 174 and/or may be stored in the feature(s) database for use by the classification model(s) 174.

Additionally, or alternatively, the location model 168 may utilize the identifier 210 from the user utterance to determine if the identifier 210 corresponds to an environment naming indicator, such as "kitchen," "office," and/or "living room," for example. The features 206 generated by the location model 168 may include confidence scores 226 associated with the identifier 210 corresponding to an environment naming indicator, with the most favorable score 226 being associated with the environment naming indicator that most closely corresponds to the identifier 210. By way of example, if the user utterance includes "turn on the kitchen lights." The location model 168 may identify "kitchen" as an environment naming indicator and may utilize that information to determine which accessory device associated with the "kitchen" and/or with a naming indicator of "kitchen" is most likely to correspond to "kitchen lights" from the user utterance.

Additionally, or alternatively, the semantic grouping component 170 may utilize the identifier 210 from the user utterance to determine semantic similarities and affinities to identify the accessory device most likely to correspond to the identifier 210, even in instances where the naming indicator 212 for the accessory device has not been setup by the user and/or is associated with a default naming indicator, such as "light A," for example. For example, the user utterance may include "turn on cooking lights," but the voice-enabled device may not be associated with an accessory device with the naming indicator 212 of "cooking lights." A semantic grouping component 170, which may be a component of the classification model 174 and/or may be another component of the remote system 110, may determine a semantic similarity between the word "cooking" and one or more words from naming indicators typically utilized for accessory devices. For example, the semantic grouping component 170 may determine that "cooking" is semantically similar to "kitchen." The semantic grouping component 170 may then determine similarities between the semantically-similar word, here "kitchen," and device-group naming indicators and/or naming indicators for voice-enabled devices.

For example, the user may have assigned or otherwise selected "kitchen" as a naming indicator for a device group that includes accessory devices located in the kitchen associated with the user, and/or the user may have assigned or otherwise selected "kitchen" as a naming indicator for the voice-enabled device. Additionally, or alternatively, usage data aggregated from use of voice-enabled devices in one or more other spaces may be utilized to determine that "cooking light" frequently refers to an accessory device with a "light" device type that is generally given a naming indicator 212 with the word "kitchen." Some or all of this information may be utilized by the semantic grouping component 170 to determine that the accessory device with the default naming indicator of "light A," which is associated with the "kitchen" device group, and/or is associated with the "kitchen" voice-enabled device, and/or that is associated with the usage data may be given the naming indicator "kitchen light," and may be acted upon given the user utterance of "turn on cooking light."

Additionally, or alternatively, the remote system 110 may be configured to utilize prior-request data 228 to generate features 206 that include prior-request scores 230. For example, multiple accessory devices may be associated with a voice-enabled device, and the prior-request data 228 may indicate a time at which a given accessory device was operated in response to a user utterance. The accessory device that was operated closest in time to when the audio data was received may be more likely to correspond to the target accessory device than other accessory devices. For example, a previous user utterance may have been "turn on Bedroom Light." Thereafter, another user utterance received 10 minutes later may be "turn off light." The prior-request data 228 may indicate the time at which the Bedroom Light was turned on, and upon receiving the audio data corresponding to the user utterance of "turn off light," the remote system 110 may determine, as a feature 206 for input into the classification model(s) 174, a prior-request score 230.

Additionally, or alternatively, the remote system 110 may be configured to utilize the current device state 232 to generate features 206 that include device-state scores 234. For example, the accessory devices may be associated with states, such as "on," "off," "idle," "active," etc. A user utterance may include "turn off the light." In this example, the intent may be to deactivate or otherwise turn off an accessory device, but an identifier of the accessory device was not provided. However, only a portion or only one accessory device may be in a state that is "on" or similar, and this information can be used by the remote system 110 to determine that other accessory devices that are already in an "off" state are not likely candidates for target-device resolution. Device-state scores 234 may be determined by the remote system 110 as features 206 for input into the classification model(s) 174.

Based at least in part on the features 206 as described herein, the classification model(s) 174 may determine which accessory devices are most likely to correspond to the accessory device intended to be acted upon. For example, the classification model(s) 174 may generate the output data 208 representing a ranked list 236 of the accessory devices, with the highest-ranking accessory device being the most likely device to be acted upon. For example, as shown in FIG. 2, five accessory devices were considered for target-device resolution. The classification model(s) 174, utilizing the features 206 as described above, may generate the ranked list 236 of the five accessory devices. By way of example, Device 1 is determined to be the highest-ranking accessory device with a score of 0.92. It should be understood that while example scores are provided herein, the "scores" may be any value and may use any scale that ranks the accessory devices. A target-inference component of the remote system 110 may provide the naming indicator and/or device identifier of the highest-ranking accessory device to a smart-home speechlet, for example, to generate directive data. The directive data may represent a directive for the voice-enabled device and/or other components of the remote system 110 to perform a directive, such as activation and/or deactivation, on the highest-ranking accessory device.

Figure 3:
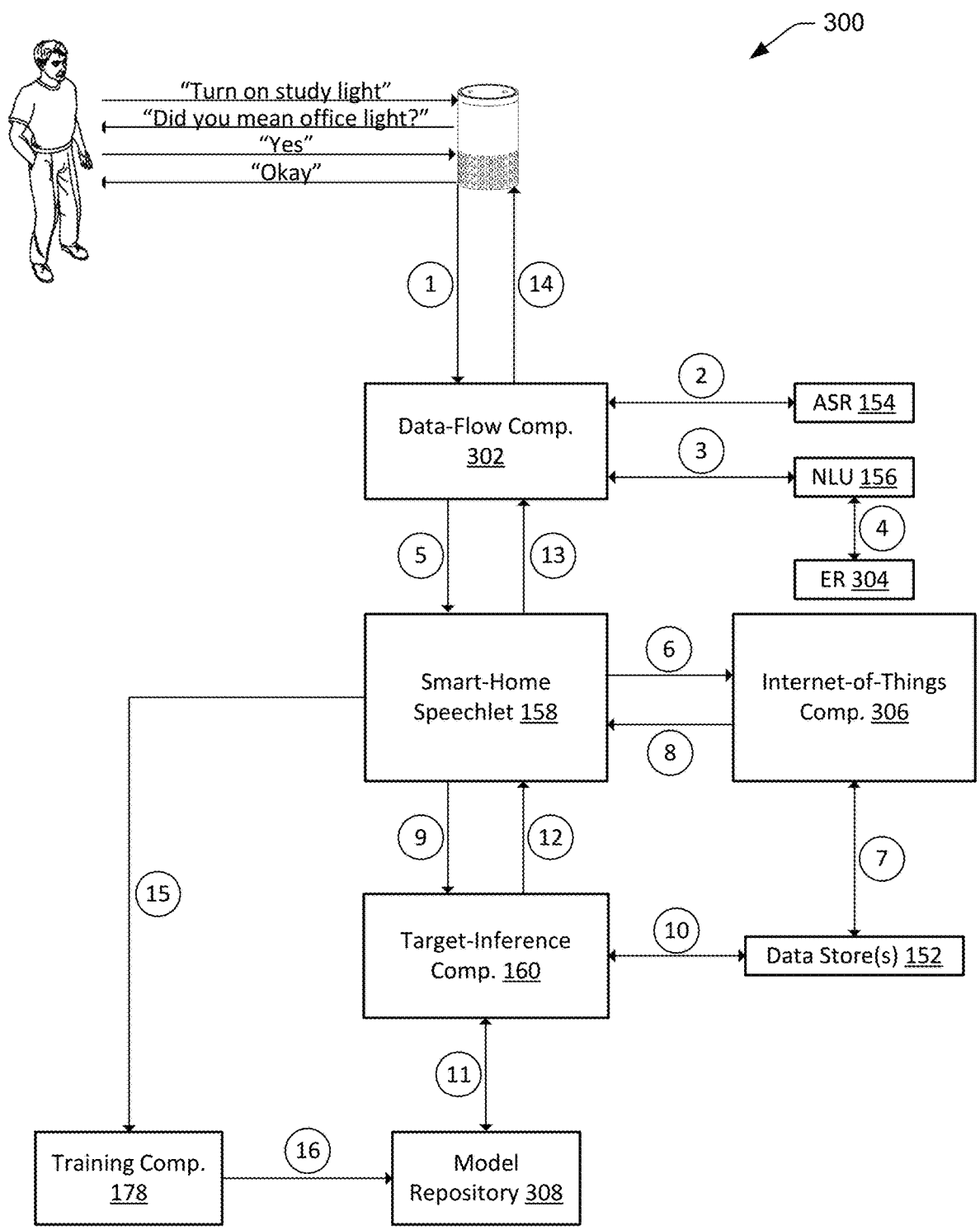
FIG. 3 illustrates a conceptual diagram of components of a system for target-device resolution.

FIG. 3 illustrates a conceptual diagram of components of a system 300 for target-device resolution. The example provided in FIG. 3 shows a user interacting with a voice-enabled device 102 and the flow of data and/or operations between the voice-enabled device 102 and example components of the remote system 110. This example is provided using a number of steps, from 1 to 16, but it should be understood that the process may include additional and/or different steps as described elsewhere herein. Additionally, while the steps are numbered in chronological order, the steps need not be performed in that order but are instead provided as an example order with respect to FIG. 3.

For example, a user may speak a user utterance such as "turn on study light," and audio corresponding to the user utterance may be captured by microphones of the voice-enabled device 102. Audio data corresponding to the audio may be generated and may, at step 1, be send to the remote system 110. In examples, the audio data may be received by a data-flow component 302, which may be configured to send the audio data and/or other data such as device identifiers, timing data, state data, etc. to other components of the remote system 110 and/or third-party systems. At step 2, the data-flow component 302 may cause the audio data to be sent to an ASR component 154, which may generate text data corresponding to the audio data. Here, the text data may be the phrase "turn on study light." The ASR component 154 may return the text data to the data-flow component 302, which may cause the text data to be sent to an NLU component 156 at step 3. The NLU component 156 may generate intent data based at least in part on the text data. Here, the intent data may include a determination of a "turn on" intent as well as a payload and/or device identifier of "study light." In examples, at step 4, the NLU component 156 may send the intent data or a portion thereof to an entity recognition (ER) component 304, which may be utilized to identify portions of query text that correspond to a named entity that may be recognizable by the system. A process called named entity resolution may link a text portion to a specific entity known to the system. The NLU component 156 may return the intent data to the data-flow component 302.

In examples, given the intent data indicating that the user utterance is associated with a "turn on" intent, the NLU component 156 and/or the data-flow component 302 may determine one or more speechlets that are configured to perform operations associated with a "turn on" or similar intent. In this example, the "turn on" intent may be associated with a smart-home speechlet 158, which may be configured to process requests to control operation of accessory devices, such as smart devices, via the voice-enabled device 102. As such, at step 5, the data-flow component 302 may send the intent data and/or a portion thereof to the smart-home speechlet 158 for further processing.

At step 6, the smart-home speechlet 158 may request naming indicator information from an internet-of-things component 306. By way of example, the smart-home speechlet 158, having received the intent data, may determine that a command or instruction to "turn on" an accessory device is desired, but the smart-home speechlet 158 may also determine which accessory device associated with the voice-enabled device should be turned on. To make this determination, the smart-home speechlet 158 may provide the payload of "study light" to the internet-of-things component 306. At step 7, the internet-of-things component 306 may query one or more data stores 152 and/or user registries 150 to identify naming indicators of accessory devices that are associated with the voice-enabled device 102. For example, the voice-enabled device 102 may be associated with a user account, which may store information indicating the accessory devices that the voice-enabled device 102 has been configured to control. For example, the accessory devices may include a light with the naming indicator of "kitchen light" and another light with the naming indicator of "office light." The internet-of-things component 306 may receive data representing the naming indicators of the accessory devices and may attempt to determine which of the naming indicators corresponds to the payload, here "study light." In this example, neither "office light" nor "kitchen light" correspond to "study light," and as such, the internet-of-things component 306, at step 8, may return a response to the smart-home speechlet 158 indicating that an accessory device was not found for the identifier "study light."

At step 9, based at least in part on receiving the indication that the internet-of-things component 306 could not find an accessory device naming indicator for the identifier, the smart-home speechlet 158 may, at step 9, send a request for target-device resolution to a target-inference component 160. The smart-home speechlet 158 may also send data indicating the device identifier for the voice-enabled device 102 and/or the payload representing the identifier of the target accessory device. At this point, it should be noted that steps 6-8 may not be performed and instead, upon receiving the intent data at step 5, the smart-home speechlet 158 may request target-device resolution from the target-inference component 160 without waiting for the internet-of-things component 306 to return results. Alternatively, the processes described with respect to steps 6-8 may be performed in parallel with steps 9-12.

At step 10, the target-inference component 160 may query the data store(s) 152 and/or the user registries 150 for data to assist in target-device resolution. For example, the data may include naming indicators of the accessory devices associated with the voice-enabled device 102 from which the audio data was received, device-state data indicating historical activation and deactivation of the accessory devices, utterance data indicating historical operation of the accessory devices by user utterances, prior-request data indicating which accessory devices were activated and/or deactivated recently, device-affinity data indicating frequencies at which accessory devices are controlled by voice-enabled devices, current device state indicating the state of accessory devices at or near the time the audio data is received, and/or the audio data received from the voice-enabled device 102.

At step 11, the target-inference component 160 may request and receive one or more models from a model repository 308 for performing target-device resolution. The request for models may be based at least in part on the data received from the smart-home speechlet 158 and/or the data stores 152 and/or the user registry 150. The one or more models may be configured to utilize some or all of the data to generate features for input into a classification model, which may generate output data representing a ranked list of the accessory devices. For example, a linguistics model may utilize the identifier from the user utterance and the naming indicators of the accessory devices to determine semantic similarities for some or all identifier/naming indicator pairs. The features generated by the linguistics model may include semantic-similarity scores for some or all of the pairs, with the most favorable score being associated with the naming indicator that was determined by the linguistic model to be most semantically similar to the identifier from the user utterance.

By way of further example, a device-activation model may utilize the device-state data and/or the utterance data to determine probabilities that the accessory devices are operated at the time when the audio data is received. A probability may be determined for some or all of the accessory devices associated with the voice-enabled device. The features generated by the device-activation model may include device-activation scores for some or all of the accessory devices, with the most favorable score being associated with the accessory device that is most frequently operated during the time and/or within a time range that includes the time.

By way of further example, a device-affinity model may utilize the device-affinity data to determine frequencies at which accessory devices are operated by voice-enabled devices. For example, some accessory devices may be operated more frequently by one voice-enabled device over another voice-enabled device, such as accessory devices in a kitchen being operated more frequently by a voice-enabled device situated in the kitchen. A frequency and/or score indicating how frequent some or all of the accessory devices are utilized by some or all of the voice-enabled devices may be determined by the device-affinity model. The features generated by the device-affinity model may include device-affinity scores, with the most favorable score being associated with the accessory device that is most frequently operated by the voice-enabled device from which the audio data was received.

By way of further example, a location model may utilize the identifier from the user utterance to determine if the identifier corresponds to an environment naming indicator, such as "kitchen," "office," and/or "living room," for example. The features generated by the location model may include confidence scores associated with the identifier corresponding to an environment naming indicator, with the most favorable score being associated with the environment naming indicator that most closely corresponds to the identifier.

Additionally, or alternatively, the remote system 110 may be configured to utilize the prior-request data to generate features that include prior-request scores. For example, multiple accessory devices may be associated with a voice-enabled device, and the prior-request data may indicate a time at which a given accessory device was operated in response to a user utterance. The accessory device that was operated closest in time to when the audio data was received may be more likely to correspond to the target accessory device than other accessory devices.

Additionally, or alternatively, the remote system may be configured to utilize the current device state to generate features that include device-state scores. For example, the accessory devices may be associated with states, such as "on," "off," "idle," "active," etc. A user utterance may include "turn off the light." In this example, the intent may be to deactivate or otherwise turn off an accessory device, but an identifier of the accessory device was not provided. However, only a portion or only one accessory device may be in a state that is "on" or similar, and this information can be used by the remote system to determine that other accessory devices that are already in an "off" state are not likely candidates for target-device resolution. Device-state scores may be determined by the remote system as features for input into the classification model.

Additionally, or alternatively, the remote system may utilize the identifier from the user utterance to determine semantic similarities and affinities to identify the accessory device most likely to correspond to the identifier, even in instances where the naming identifier for the accessory device has not been setup by the user and/or is associated with a default naming indicator, such as "light A," for example. For example, the user utterance may include "turn on cooking lights," but the voice-enabled device is not associated with an accessory device with the naming indicator of "cooking lights." The remote system may determine a semantic similarity between the word "cooking" and one or more words from naming indicators typically utilized for accessory devices. For example, the remote system may determine that "cooking" is semantically similar to "kitchen." The remote system may then determine similarities between the semantically-similar word, here "kitchen," and device-group naming indicators and/or naming indicators for voice-enabled devices.

Based at least in part on the features as described herein, the classification model may determine which accessory devices are most likely to correspond to the accessory device intended to be acted upon. For example, the classification model may generate output data representing a ranked list of the accessory devices, with the highest-ranking accessory device being the most likely device to be acted upon. In the example shown in FIG. 3, the target-inference component 160 may determine, using the classification model, that the "office light" accessory device is the highest-ranking accessory device for the identifier "study light." The target-inference component 160 may provide the naming indicator and/or device identifier of the highest-ranking accessory device to the smart-home speechlet 158 at step 12.

The smart-home speechlet 158, now having identified the "turn on" intent and having received the naming indicator for the accessory device to be acted on, here the "office light," may generate directive data representing a directive for the voice-enabled device 102 and/or other components of the remote system 110 to perform a directive, such as activation and/or deactivation, on the highest-ranking accessory device. In examples, the smart-home speechlet 158 may send the naming indicator for the accessory device to be acted on to the internet-of-things component 306, which may generate the instruction to perform an action such as activation and/or deactivation of the accessory device. Additionally, or alternatively, the remote system 110 may generate audio data representing a request for the user of the voice-enabled device 102 to confirm that the identified accessory device is the device the user intended for the system to act upon.

At step 13, the smart-home speechlet 158 may send the directive data and/or audio data to the data-flow component 302, which may, at step 14, send the directive data and/or the audio data to the voice-enabled device 102. In the example shown with respect to FIG. 3, the directive data represents a directive to output the audio "did you mean office light?" via speakers of the voice-enabled device 102. The user may speak a response, here "yes," which may be captured by the microphones of the voice-enabled device 102, and corresponding audio data may be generated and sent to the remote system 110. Having received confirmation that the "office light" is to be "turned on," the remote system 110 may send directive data to the voice-enabled device 102 directing it to cause the accessory device with the naming indicator of "office light" to activate. Audio may be output by the speakers of the voice-enabled device 102 to confirm that the action has been taken, such as "okay."

At step 15, the results of the target-device resolution process described herein, as well as feedback data corresponding to the response provided by the user, may be sent to a training component 178 to train the one or more models described herein and/or to generate new models to be utilized for target-device resolution. The training component 178 may receive feedback data representing an indication that the target device corresponds to a given accessory device and may generate, based at least in part on the feedback data, training data representing the indication as a target attribute. The training component 178 may determine an association between the target attribute and at least one of the features or at least a portion of the intent data as generated by the NLU component 156, and may generate, at step 16 and based at least in part on the association, one or more new models and/or portions thereof to be utilized in place of the previous models.

Figure 4:
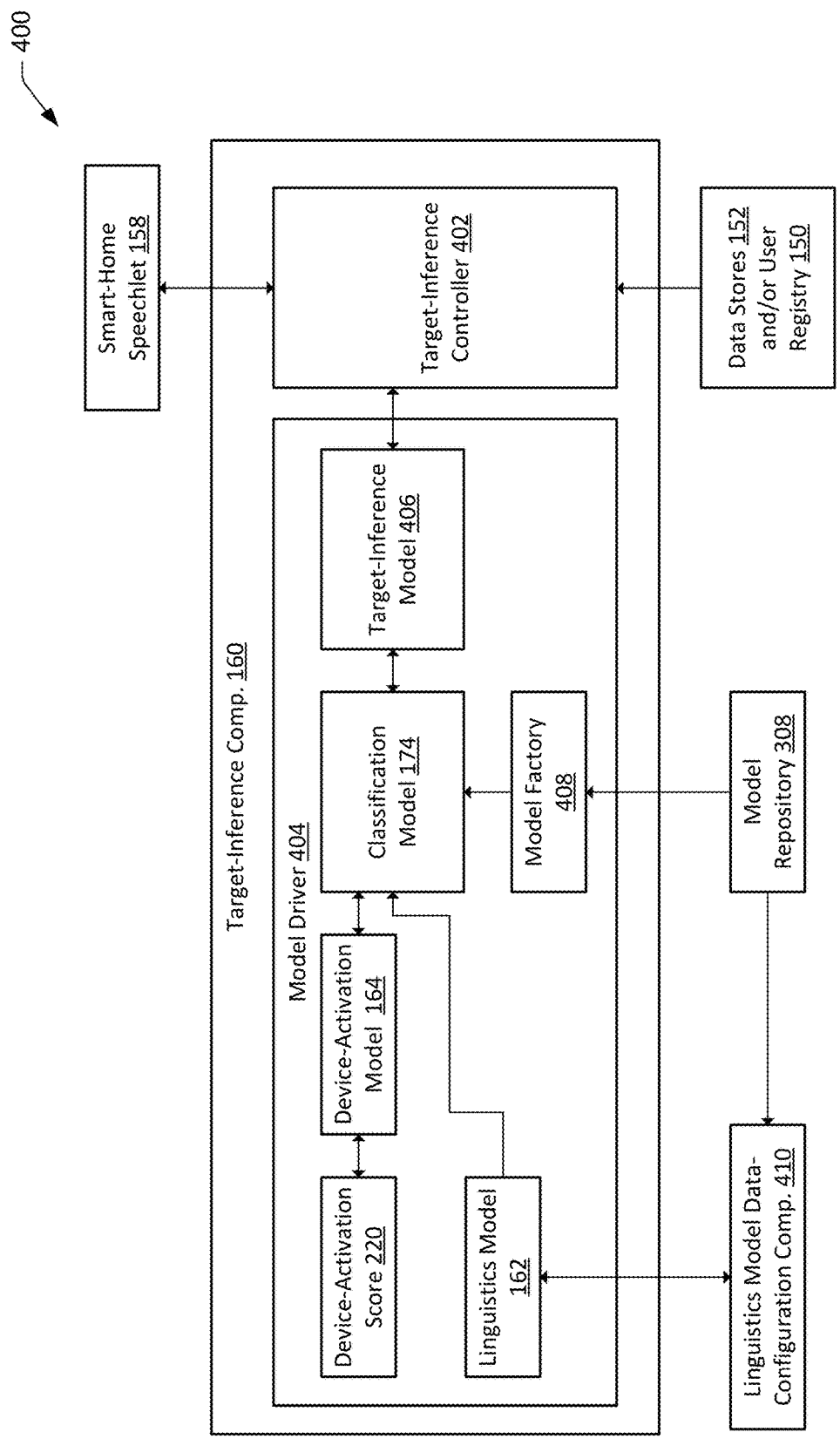
FIG. 4 illustrates a conceptual diagram of components of a target-inference component for target-device resolution.

FIG. 4 illustrates a conceptual diagram of components of system 400 including a target-inference component 160 for target-device resolution. The system 400 may be considered components of the remote system 110, as described herein. For example, the system 400 may include a smart-home speechlet 158, the target-inference component 160, data stores 152, user registries 150, and model repositories 308. FIG. 4 illustrates additional components and/or operations performed by the target-inference component 160 from FIG. 1 and FIG. 3. For example, as described more fully above, the smart-home speechlet 158 may request target-device resolution from the target-inference component 160, such as in response to an internet-of-things component returning results indicating that an accessory device was not found that corresponds to the identifier provided in a user utterance and/or that multiple accessory devices were found to correspond to the identifier. A target-inference controller 402 may receive the request from the smart-home speechlet 158 and may attempt to obtain data for performing target-device resolution from the data stores 152 and/or the user registry 150. The target-inference controller 402 may send some or all of the data received from the data stores 152 and/or the user registry 150 to a model driver 404. Specifically, the data may be sent to a target-inference model 406, which may be configured to format the data for use by the classification model 174. Formatting of the data may include identifying data that may be utilized by the classification model 174 and/or vectorizing such data.

Data from the target-inference model 406 may be provided to the classification model 174, such as in the form of a feature configured for input into the classification model 174. Additionally, or alternatively, the device-activation model 164 of the model driver 404 may generate device-activation scores 220, as described herein, as features for input into the classification model 174. Additionally, or alternatively, the linguistics model 162 of the model driver 404 may generate semantic-similarity scores, such as by using the linguistics model data-configuration component 410, for input as features into the classification model 174. Additional models, such as a device-activation model and/or a device-affinity model, and/or a location model may be received from the model repository 308 and utilized by the model factory 408 to generate additional features for input into the classification model 174. The classification model 174, having received the features as described herein as inputs, may generate a ranking of accessory devices to be utilized to resolve the target device to be acted upon in light of a user utterance.

Figure 5:
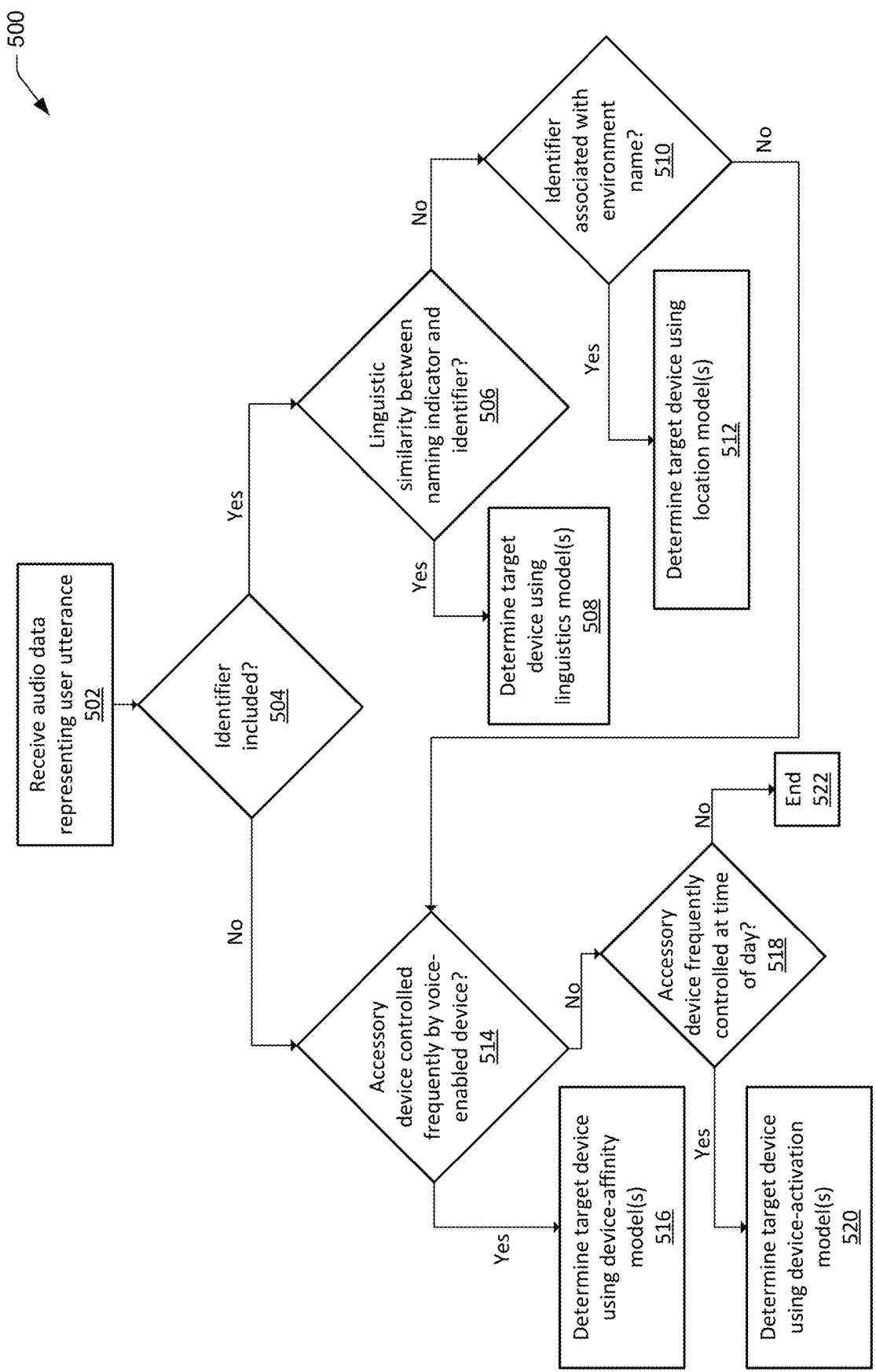
FIG. 5 illustrates a flow diagram of an example process for target-device resolution.

FIG. 5 illustrates processes for target-device resolution. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, 10, and 11, although the processes may be implemented in a wide variety of other environments, architectures and systems.

At block 502, the process 500 may include receiving audio data representing a user utterance. For example, a user may speak a user utterance such as "turn on study light," and audio corresponding to the user utterance may be captured by microphones of the voice-enabled device. Audio data corresponding to the audio may be generated and may be sent to a remote system.

At block 504, the process 500 may include determining whether an identifier for a target accessory device was provided in the user utterance. For example, ASR and NLU techniques may be utilized, as described more fully with respect to FIG. 10, to determine whether the user utterance included an identifier. By way of example, the user utterance of "turn on light" may not be determined to include an identifier of the accessory device, while the user utterance of "turn on study light" may be determined to include the identifier of "study light."

If the identifier is determined to be included in the user utterance, then at block 506 the process 500 may include determining whether there is linguistic similarity, such as a threshold amount and/or degree of linguistic similarity, between the identifier and a naming indicator associated with an accessory device. For example, an identifier of "study light" may have a high degree of linguistic similarity to "office light" and a lower degree of linguistic similarity to "kitchen light." One or more linguistics models, as described herein, may be utilized to determine whether the threshold degree of linguistic similarity is present. At block 508, if the identifier is linguistically similar to a naming indicator, the linguistics models may be utilized to determine the target accessory device using the linguistic similarity determination.

If the identifier is not linguistically similar to a naming indicator of an accessory device, then at block 510, the process 500 may include determining whether the identifier is associated with a space name. For example, the identifier may be "study light," which may be determined to be associated with a space such as a study or office, and/or the identifier "kitchen light" may be determined to be associated with a space such as a kitchen. By way of further example, the identifier of "Rob's light" may be determined to not be associated with a space. If the identifier is associated with a space name, then at block 512, the process 500 may include determining the target device using a location model as described herein.

If the identifier is determined to be not associated with an environment naming indicator, then at block 514, the process 500 may include determining whether at least one accessory device is controlled frequently, such as more than a threshold frequency, by the voice-enabled device from which the audio data was received. For example, in a space including multiple voice-enabled devices, some accessory devices may be controlled more frequently by one voice-enabled device than other voice-enabled devices. This device affinity may be utilized to assist in target-device resolution. If an accessory device is controlled frequently by the voice-enabled device, then at block 516, the process 500 may include determining the target device using device-affinity models as described herein.

If an accessory device is not more frequently controlled by the voice-enabled device than other voice-enabled devices, then at block 518, the process 500 may include determining whether an accessory device is frequently controlled at the time of day and/or day of the week when the audio data was received. For example, a particular accessory device may be activated 95% of the time on weekdays at or around 8:00 pm. If the audio data was received at or around 8:00 pm, then it may be determined that the accessory device that is frequently activated is the target device. In these examples, at block 520, the process 500 may include determining the target device using device-activation models as described herein.

If an accessory device is not frequently controlled at the time of day and/or the day of the week, then at block 522, the process 500 may end and the user may be informed, such as via audio output by speakers of the voice-enabled device, that an accessory device could not be found that corresponds to the identifier in the user utterance.

Figure 6:
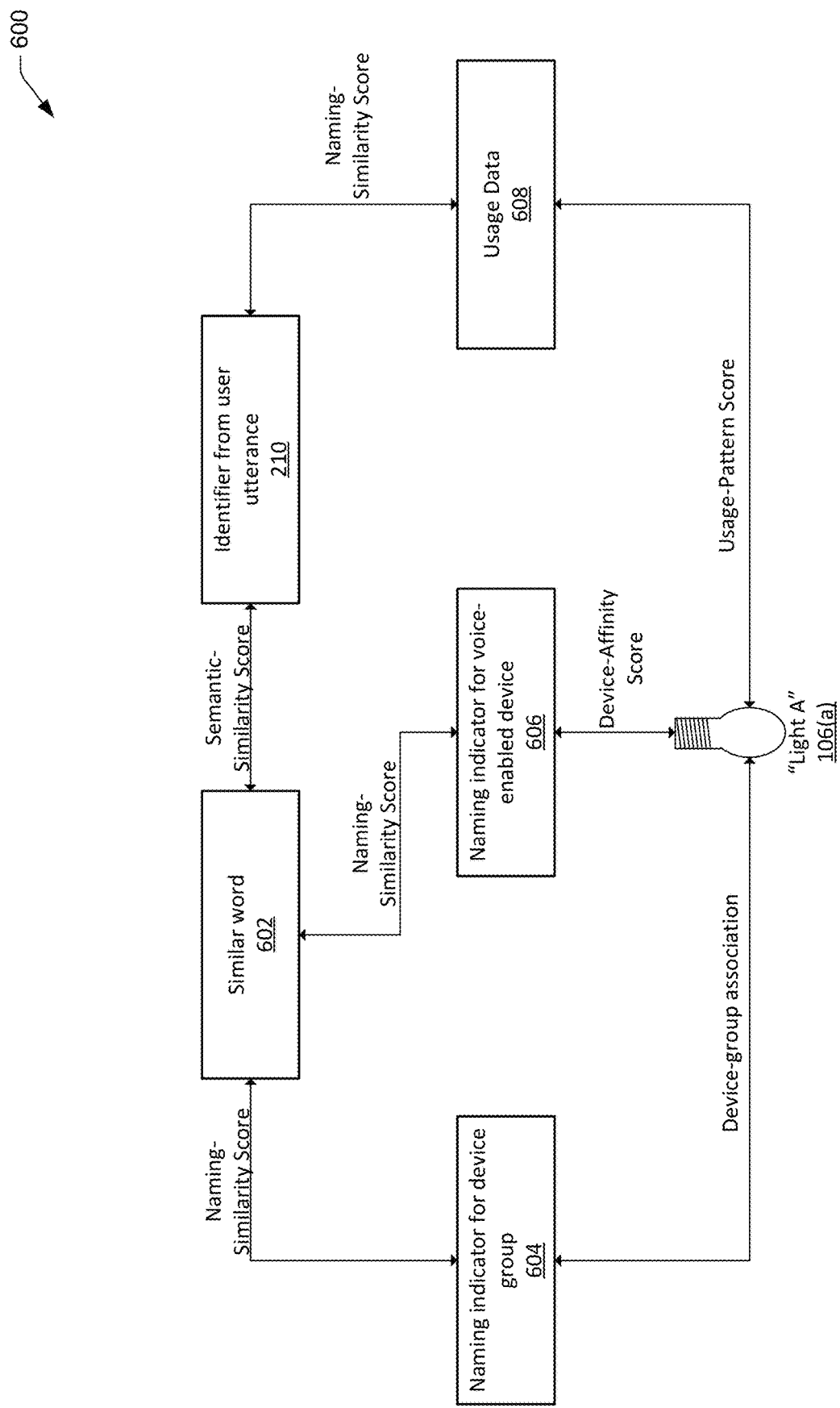
FIG. 6 illustrates a conceptual diagram of data utilized by a system for target-device resolution of a device with a default naming indicator.

FIG. 6 illustrates a conceptual diagram of data utilized by a system 600 for target-device resolution of an accessory device with a default naming indicator. The system 600 may illustrate the identification, determination, generation, and/or transfer of the types of data illustrated in FIG. 6, such as using the semantic grouping component 170 as described with respect to FIG. 1.

For example, the semantic grouping component 170 may be configured to utilize the identifier 210 from the user utterance to determine semantic similarities and affinities to identify the accessory device most likely to correspond to the identifier 210, even in instances where the naming identifier for the accessory device has not been setup by the user and/or is associated with a default naming indicator, such as "light A," for example. For example, the user utterance may include "turn on cooking lights," but the voice-enabled device is not associated with an accessory device 106(*a*) with the naming indicator of "cooking lights." The semantic grouping component 170 may determine a semantic similarity between the word "cooking" and one or more similar words 602, such as words from naming indicators typically utilized for accessory devices. For example, the remote system 110 may determine that "cooking" is semantically similar to "kitchen." The remote system 110 may then determine similarities between the semantically-similar word, here "kitchen," and device-group naming indicators 604 and/or naming indicators 606 for voice-enabled devices.

For example, the user may have assigned or otherwise selected "kitchen" as a naming indicator 604 for a device group that includes accessory devices located in the kitchen associated with the user, and/or the user may have assigned or otherwise selected "kitchen" as a naming indicator 606 for the voice-enabled device. Additionally, or alternatively, usage data 608 aggregated from use of voice-enabled devices in one or more other spaces may be utilized to determine that "cooking light" frequently refers to an accessory device with a "light" device type that is generally given a naming indicator with the word "kitchen." Some or all of this information may be utilized by the semantic grouping component 170 to determine that the accessory device 106(*a*) with the default naming indicator of "light A," which is associated with the "kitchen" device group, and/or is associated with the "kitchen" voice-enabled device, and/or that is associated with the usage data 608 may be given the naming indicator "kitchen light," and may be acted upon given the user utterance of "turn on cooking light."

To further illustrate, the identifier 210 from the user utterance may be "cooking light." Semantic-similarity scores may be determined for word pairs including "cooking" and a similar word 602. The word pair with the most favorable semantic-similarity score may be identified and the similar word 602 may be compared and/or otherwise analyzed with respect to device-group naming indicators 604. Naming-similarity scores may be determined for some or all device-group naming indicators 604. Additionally, or alternatively, the similar word 602 may be compared and/or otherwise analyzed with respect to naming indicators 606 of voice-enabled devices. Naming-similarity scores may be determined for some or all naming indicators 606 for the voice-enabled devices. Additionally, or alternatively, the identifier 210 may be analyzed with respect to the usage data 608 and naming-similarity scores may be generated for pairs of identifiers 210 and naming indicators identified by the usage data 608.

In examples, the device-group association, device-affinity scores as between the accessory device and the voice-enabled device, and usage-pattern scores may be utilized to resolve the target device and/or to set a naming indicator for the target device. Here, the user utterance that includes the identifier 210 "cooking light" may be utilized to determine the similar word "kitchen," which may be compared to the device-group naming indicator 604 "kitchen group" and the naming indicator 606 "kitchen device" for the voice-enabled device. Additionally, the usage data 608 may indicate that "cooking light" typically refer to "kitchen lights." Some or all of this information may be utilized to determine that "cooking light" refers to "light A."

Figure 7:
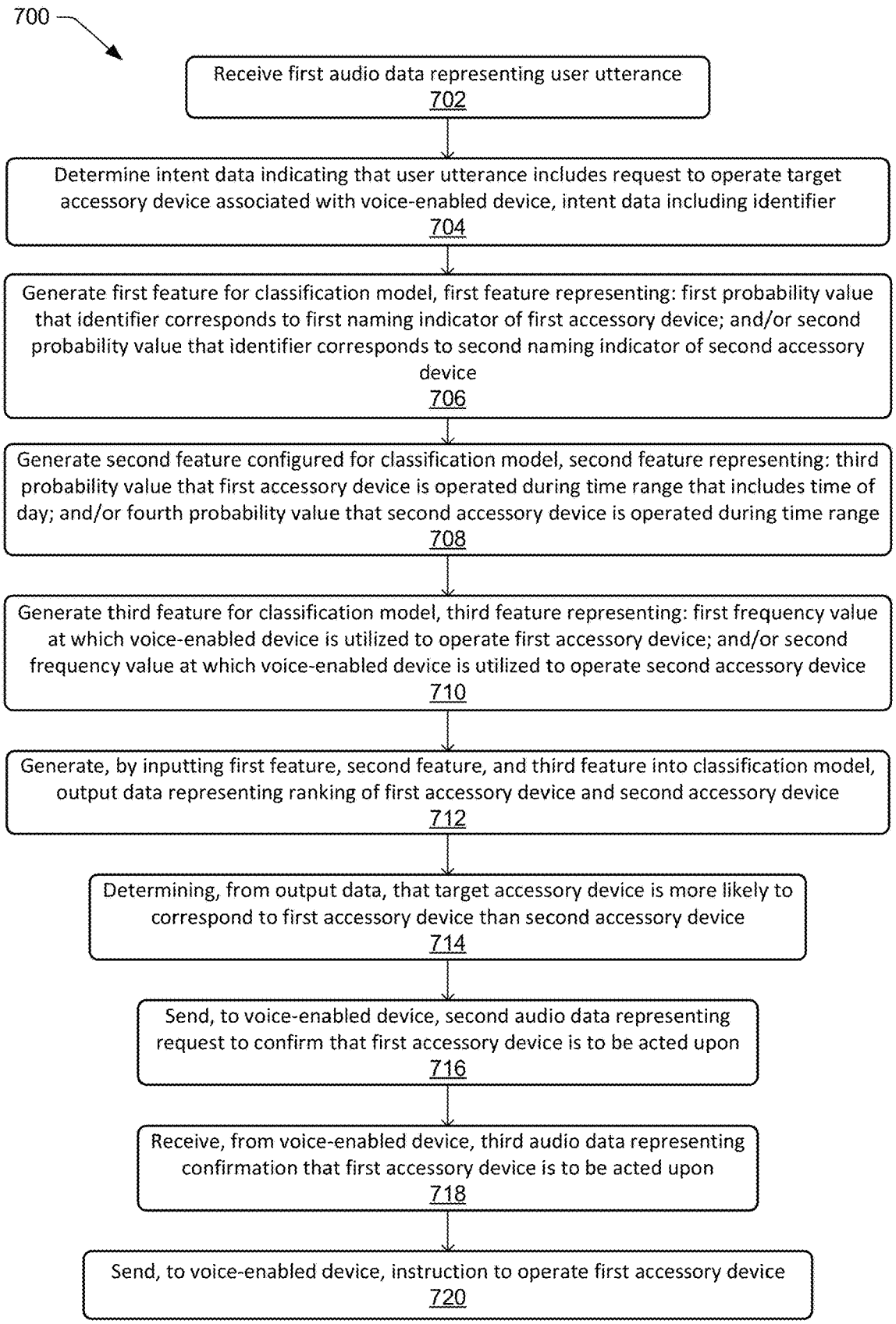
FIG. 7 illustrates a flow diagram of an example process for target-device resolution using linguistics models, device-activation models, and device-affinity models.
Figure 8:
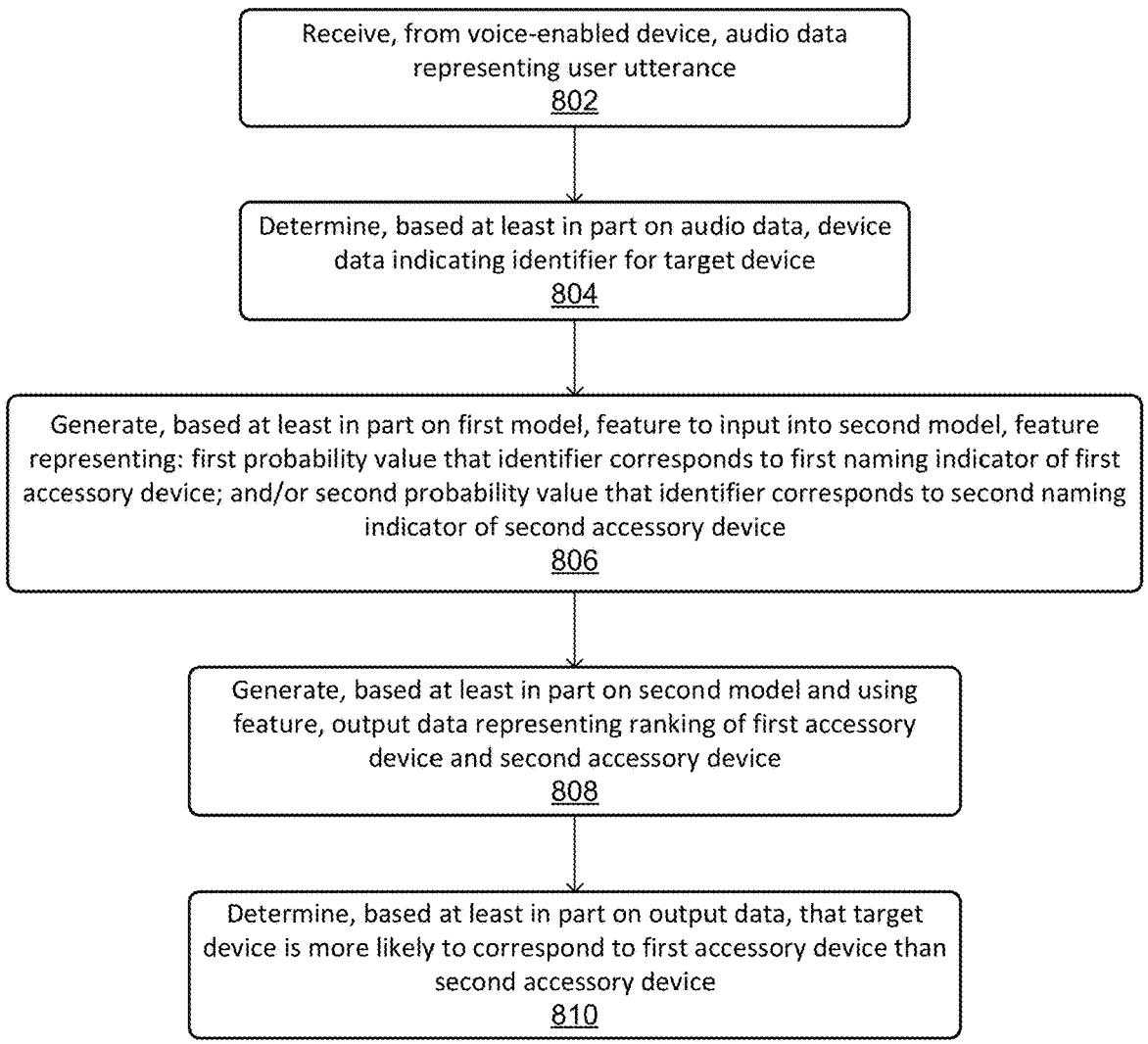
FIG. 8 illustrates a flow diagram of an example process for target-device resolution.
Figure 9:
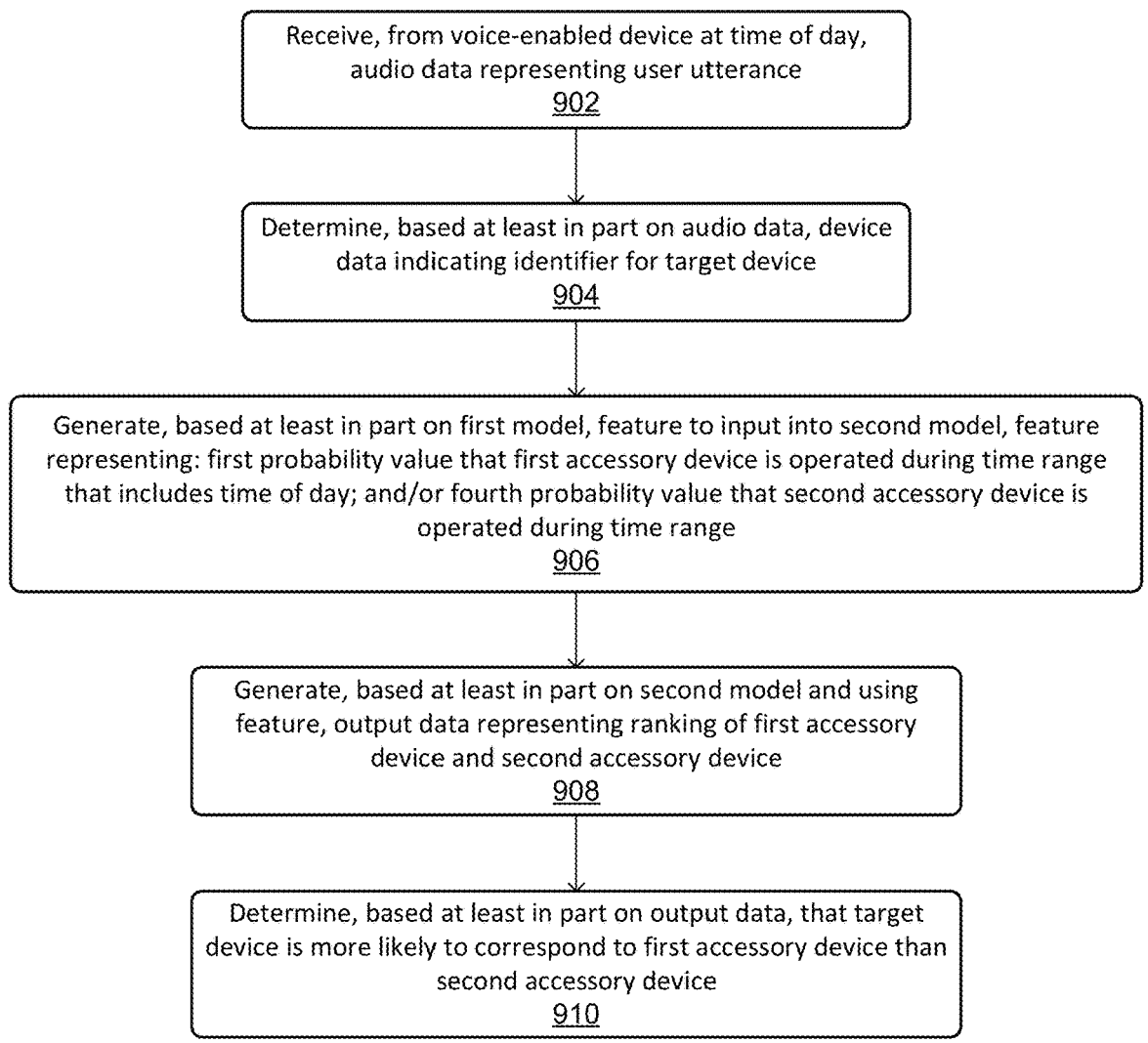
FIG. 9 illustrates a flow diagram of another example process for target-device resolution.

FIGS. 7-9 illustrate various processes for target-device resolution. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 10, and 11, although the processes may be implemented in a wide variety of other environments, architectures and systems.

FIG. 7 illustrates a flow diagram of an example process for target-device resolution using linguistics models, device-activation models, and device-affinity models. The order in which the operations or steps are described is not intended to be construed as a limitation, and any number of the described operations may be combined in any order and/or in parallel to implement process 700.

At block 702, the process 700 may include receiving, from a voice-enabled device and at a time of day, first audio data representing a user utterance. For example, a user may speak a user utterance such as "turn on study light," and audio corresponding to the user utterance may be captured by microphones of the voice-enabled device. Audio data corresponding to the audio may be generated and may be sent to a remote system. In examples, the audio data may be received by a data-flow component, which may be configured to send the audio data and/or other data such as device identifiers, timing data, state data, etc. to other components of the remote system and/or third-party systems.

At block 704, the process 700 may include determining, from the audio data, intent data indicating that the user utterance includes a request to operate a target accessory device associated with the voice-enabled device, the intent data including an identifier for the target accessory device. For example, the data-flow component may cause the audio data to be sent to an ASR component, which may generate text data corresponding to the audio data. The ASR component may return the text data to the data-flow component, which may cause the text data to be sent to an NLU component. The NLU component may generate intent data based at least in part on the text data. In the example provided herein, the intent data may include a determination of a "turn on" intent as well as a payload and/or device identifier of "study light."

At block 706, the process 700 may include generating, using a linguistics model, a first feature to input into a classification model, the first feature representing at least one of: a first probability value indicating that the identifier corresponds to a first naming indicator of a first accessory device associated with the voice-enabled device; and/or a second probability value indicating that the identifier corresponds to a second naming indicator of a second accessory device associated with the voice-enabled device. For example, the linguistics model(s) may utilize the identifier from the user utterance and the naming indicators of the accessory devices to determine semantic similarities for some or all identifier/naming indicator pairs. The features generated by the linguistics model(s) may include semantic-similarity scores for some or all of the pairs, with the most favorable score being associated with the naming indicator that was determined by the linguistic model(s) to be most semantically similar to the identifier from the user utterance. For example, with an identifier of "study light," a more favorable similarity score would be determined for the naming indicator "office light" than the naming indicator for "kitchen light" because "study" and "office" are more semantically similar than "study" and "kitchen." These features may be configured to be input into classification model(s) and/or may be stored in a feature(s) database for use by the classification model(s).

At block 708, the process 700 may include generating, using a device-activation model, a second feature to input into the classification model, the second feature representing at least one of: a third probability value indicating that the first accessory device is operated during a time range that includes the time of day; and/or a fourth probability value that the second accessory device is operated during the time range. For example, the device-activation model(s) may utilize the device-state data and/or the utterance data to determine probabilities that the accessory devices are operated at the time when the audio data is received. A probability may be determined for some or all of the accessory devices associated with the voice-enabled device. The features generated by the device-activation model(s) may include device-activation scores for some or all of the accessory devices, with the most favorable score being associated with the accessory device that is most frequently operated during the time and/or within a time range that includes the time at which the audio data was received.

At block 710, the process 700 may include generating, using a device-affinity model, a third feature to input into the classification model, the third feature representing at least one of: a first frequency value at which the voice-enabled device is utilized to operate the first accessory device; and/or a second frequency value at which the voice-enabled device is utilized to operate the second accessory device. By way of example, device-affinity model(s) may utilize the device-affinity data to determine frequencies at which accessory devices are operated by voice-enabled devices. For example, some accessory devices may be operated more frequently by one voice-enabled device over another voice-enabled device, such as accessory devices in an office being operated more frequently by a voice-enabled device situated in the office. A frequency and/or score indicating how frequent some or all of the accessory devices are utilized by some or all of the voice-enabled devices may be determined by the device-affinity model(s). The features generated by the device-affinity model(s) may include device-affinity scores, with the most favorable score being associated with the accessory device that is most frequently operated by the voice-enabled device from which the audio data was received. These features may be configured to be input into the classification model(s) and/or may be stored in the feature(s) database for use by the classification model(s).

At block 712, the process 700 may include generating, by inputting the first feature, the second feature, and the third feature into the classification model, output data representing a ranking of the first accessory device with respect to the second accessory device. For example, based at least in part on the features as described herein, the classification model(s) may determine which accessory devices are most likely to correspond to the accessory device intended to be acted upon. For example, the classification model(s) may generate output data representing a ranked list of the accessory devices, with the highest-ranking accessory device being the most likely device to be acted upon.

At block 714, the process 700 may include determining, from the output data, that the target accessory device is more likely to correspond to the first accessory device than the second accessory device. For example, a target-inference component may provide the naming indicator and/or device identifier of the highest-ranking accessory device to the smart-home speechlet, for example, to generate directive data.

At block 716, the process 700 may include sending, to the voice-enabled device, second audio data representing a request to confirm that the first accessory device is to be acted upon. For example, the directive data may represent a directive for the voice-enabled device and/or other components of the remote system to perform a directive, such as activation and/or deactivation, on the highest-ranking accessory device. Additionally, or alternatively, a TTS component may generate audio data representing a request for the user of the voice-enabled device to confirm that the identified accessory device is the device the user intended for the system to act upon.

At block 718, the process 700 may include receiving, from the voice-enabled device, third audio data representing a confirmation that the first accessory device is to be acted upon. For example, audio data representing the response of the user may be received at the remote system for processing.

At block 720, the process 700 may include sending, to the voice-enabled device, an instruction to operate the first accessory device. For example, if the response confirms that the accessory device was selected accurately by the remote system, the directive data may be sent to the voice-enabled device Additionally, or alternatively, the process 700 may include determining, from usage data indicating past operation of the first accessory device by the voice-enabled device, a space in which the first accessory device is located and identifying a naming indicator associated with the space. The process 700 may also include generating, using a location model, a fourth feature to input into the classification model. The fourth feature may indicate that the identifier corresponds to the naming indicator associated with the space. In these examples, generating the output data may be based at least in part on inputting the fourth feature into the classification model.

Additionally, or alternatively, the process 700 may include storing naming data indicating that the first accessory device is associated with a device group having a device-group naming indicator and that the voice-enabled device has a naming indicator with a common word as between the device-group naming indicator and the voice-enabled-device naming indicator. The naming data may further indicate that a device type associated with the first accessory device is associated with the common word. The process 700 may also include determining that the identifier has at least a threshold degree of semantic similarity with the common word. In these examples, determining that the target device is more likely the first accessory device than the second accessory device may be based at least in part on the device-group naming indicator and the voice-enabled-device naming indicator having the common word and the device type being associated with the common word.

Additionally, or alternatively, the process 700 may include determining, based at least in part on at least one of the first probability value and/or the second probability value, a first confidence value associated with the first feature and determining, based at least in part on the first confidence value, a first weighting value to attribute to the first feature. The process 700 may also include determining, based at least in part on at least one of the third probability value and/or the fourth probability value, a second confidence value associated with the second feature and determining, based at least in part on the second confidence level, a second weighting value to attribute to the second feature. The process 700 may also include determining, based at least in part on at least one of the first frequency value and the second frequency value, a third confidence value associated with the third feature and determining, based at least in part on the third confidence value, a third weighting value to attribute to the third feature. In these examples, generating the output data may be based at least in part on the first weighting value, the second weighting value, and the third weighting value.

FIG. 8 illustrates a flow diagram of an example process for target-device resolution. The order in which the operations or steps are described is not intended to be construed as a limitation, and any number of the described operations may be combined in any order and/or in parallel to implement process 800.

At block 802, the process 800 may include receiving, from a voice-enabled device, audio data representing a user utterance. For example, a user may speak a user utterance such as "turn on study light," and audio corresponding to the user utterance may be captured by microphones of the voice-enabled device. Audio data corresponding to the audio may be generated and may be sent to a remote system. In examples, the audio data may be received by a data-flow component, which may be configured to send the audio data and/or other data such as device identifiers, timing data, state data, etc. to other components of the remote system and/or third-party systems.

At block 804, the process 800 may include determining, based at least in part on the audio data, device data indicating an identifier for a target device. For example, the data-flow component may cause the audio data to be sent to an ASR component, which may generate text data corresponding to the audio data. The ASR component may return the text data to the data-flow component, which may cause the text data to be sent to an NLU component. The NLU component may generate device data and/or intent data based at least in part on the text data. In the example provided herein, the intent data may include a determination of a "turn on" intent as well as a payload and/or device identifier of "study light." The device data may indicate the identifier for the target device.

A block 806, the process 800 may include generating, based at least in part on a first model, a feature to input into a second model, the feature representing at least one of a first probability value that the identifier corresponds to a first naming indicator of a first accessory device, and/or a second probability value that the identifier corresponds to a second naming indicator of a second accessory device. For example, the first model, which may be described as a linguistics model(s), may utilize the identifier from the user utterance and the naming indicators of the accessory devices to determine semantic similarities for some or all identifier/naming indicator pairs. The features generated by the linguistics model(s) may include semantic-similarity scores for some or all of the pairs, with the most favorable score being associated with the naming indicator that was determined by the linguistic model(s) to be most semantically similar to the identifier from the user utterance. For example, with an identifier of "study light," a more favorable similarity score would be determined for the naming indicator "office light" than the naming indicator for "kitchen light" because "study" and "office" are more semantically similar than "study" and "kitchen." These features may be configured to be input into classification model(s) and/or may be stored in a feature(s) database for use by the classification model(s).

At block 808, the process 800 may include generating, based at least in part on the second model and using the feature, output data representing a ranking of the first accessory device with respect to the second accessory device. For example, based at least in part on the features as described herein, the classification model(s) may determine which accessory devices are most likely to correspond to the accessory device intended to be acted upon. For example, the classification model(s) may generate output data representing a ranked list of the accessory devices, with the highest-ranking accessory device being the most likely device to be acted upon.

At block 810, the process 800 may include determining, based at least in part on the output data, that the target device is more likely to correspond to the first accessory device than the second accessory device. For example, a target-inference component may provide the naming indicator and/or device identifier of the highest-ranking accessory device to the smart-home speechlet, for example, to generate directive data.

Additionally, or alternatively, the process 800 may include determining, from usage data indicating past operation of the first accessory device by the voice-enabled device, a space in which the first accessory device is located and identifying a naming indicator associated with the space. The process 800 may also include generating, using a third model such as, for example, a location model, another feature to input into the second model. The other feature may indicate that the identifier corresponds to the space naming indicator. In these examples, generating the output data may be based at least in part on inputting the other feature into the second model.

Additionally, or alternatively, the process 800 may include storing naming data indicating that the first accessory device is associated with a device group having a device-group naming indicator and that the voice-enabled device has a naming indicator with a common word as between the device-group naming indicator and the voice-enabled-device naming indicator. The naming data may further indicate that a device type associated with the first accessory device is associated with the common word. The process 800 may also include determining that the identifier has at least a threshold degree of semantic similarity with the common word. In these examples, determining that the target device is more likely the first accessory device than the second accessory device may be based at least in part on the device-group naming indicator and the voice-enabled-device naming indicator having the common word and the device type being associated with the common word.

Additionally, or alternatively, the process 800 may include determining, based at least in part on at least one of the first probability value and the second probability value, a first confidence value associated with the feature and determining, based at least in part on the confidence value, a weighting value to attribute to the first feature. In these examples, generating the output data may be based at least in part on the weighting value.

Additionally, or alternatively, the process 800 may include generating, based at least in part on another model which may be described herein as an on-state model, another feature to input into the other model. The other feature may represent a third probability value that the first accessory device is operated during a time range that includes the time of day at which the audio data was received, and/or a fourth probability value that the second accessory device is operated during the time range. In these examples, generating the output data may be based at least in part on inputting the other feature into the second model.

Additionally, or alternatively, the process 800 may include generating, based at least in part on another model which may be described herein as a device-affinity model, another feature to input into the other model. The other feature may represent a first frequency value at which the voice-enabled device is utilized to operate the first accessory device and/or a second frequency value at which the voice-enabled device is utilized to operate the second accessory device. In these examples, generating the output data may be based at least in part on inputting the other feature into the second model.

Additionally, or alternatively, the process 800 may include storing device-control data indicating that the first accessory device was controlled at a first time and determining that the audio data is received at a second time. The process 800 may also include determining that the second time is within a threshold amount of time of the first time and generating, based at least in part on the second time being within the threshold amount of time of the first time, a second feature to input into the second model. In these examples, generating the output data may be based at least in part on inputting the second feature into the second model.

Additionally, or alternatively, the process 800 may include receiving feedback data representing an indication that the target device corresponds to the second accessory device and generating, based at least in part on the feedback data, training data representing the indication as a target attribute. The process 800 may also include determining an association between the target attribute and at least one of the feature or at least a portion of the intent data and generating, based at least in part on the association, a third model to be utilized in place of the second model.

FIG. 9 illustrates a flow diagram of another example process for target-device resolution. The order in which the operations or steps are described is not intended to be construed as a limitation, and any number of the described operations may be combined in any order and/or in parallel to implement process 900.

At block 902, the process 900 may include receiving, from a voice-enabled device and at a time of day, audio data representing a user utterance. For example, a user may speak a user utterance such as "turn on study light," and audio corresponding to the user utterance may be captured by microphones of the voice-enabled device. Audio data corresponding to the audio may be generated and may be sent to a remote system. In examples, the audio data may be received by a data-flow component, which may be configured to send the audio data and/or other data such as device identifiers, timing data, state data, etc. to other components of the remote system and/or third-party systems.

At block 904, the process 900 may include determining, based at least in part on the audio data, device data indicating an identifier for a target device. For example, the data-flow component may cause the audio data to be sent to an ASR component, which may generate text data corresponding to the audio data. The ASR component may return the text data to the data-flow component, which may cause the text data to be sent to an NLU component. The NLU component may generate device data and/or intent data based at least in part on the text data. In the example provided herein, the intent data may include a determination of a "turn on" intent as well as a payload and/or device identifier of "study light."

At block 906, the process 900 may include generating, based at least in part on a first model, a feature to input into a second model, the feature representing: a first probability value indication that a first accessory device is operated during a time range that includes the time of day; and/or a second probability value indicating that a second accessory device is operated during the time range. For example, the first model, which may be described as a device-activation model(s), may utilize the device-state data and/or the utterance data to determine probabilities that the accessory devices are operated at the time when the audio data is received. A probability may be determined for some or all of the accessory devices associated with the voice-enabled device. The features generated by the device-activation model(s) may include device-activation scores for some or all of the accessory devices, with the most favorable score being associated with the accessory device that is most frequently operated during the time and/or within a time range that includes the time at which the audio data was received.

At block 908, the process 900 may include generating, based at least in part on the second model and using the feature, output data representing a ranking of the first accessory device with respect to the second accessory device. For example, based at least in part on the features as described herein, the classification model(s) may determine which accessory devices are most likely to correspond to the accessory device intended to be acted upon. For example, the classification model(s) may generate output data representing a ranked list of the accessory devices, with the highest-ranking accessory device being the most likely device to be acted upon.

At block 910, the process 900 may include determining, based at least in part on the output data, that the target device is more likely to correspond to the first accessory device than the second accessory device. For example, a target-inference component may provide the naming indicator and/or device identifier of the highest-ranking accessory device to the smart-home speechlet, for example, to generate directive data.

Additionally, or alternatively, the process 900 may include determining, from usage data indicating past operation of the first accessory device by the voice-enabled device, a space in which the first accessory device is located and identifying a naming indicator associated with the space. The process 900 may also include generating, using a third model such as, for example, a location model, another feature to input into the second model. The other feature may indicate that the identifier corresponds to the naming indicator. In these examples, generating the output data may be based at least in part on inputting the other feature into the second model.

Additionally, or alternatively, the process 900 may include storing naming data indicating that the first accessory device is associated with a device group having a device-group naming indicator and/or that the voice-enabled device has a naming indicator with a common word as between the device-group naming indicator and the voice-enabled-device naming indicator. The naming data may further indicate that a device type associated with the first accessory device is associated with the common word. The process 900 may also include determining that the identifier has at least a threshold degree of semantic similarity with the common word. In these examples, determining that the target device is more likely the first accessory device than the second accessory device may be based at least in part on the device-group naming indicator and the voice-enabled-device naming indicator having the common word and the device type being associated with the common word.

Additionally, or alternatively, the process 900 may include determining, based at least in part on the first probability value and the second probability value, a first confidence value associated with the feature and determining, based at least in part on the confidence value, a weighting value to attribute to the first feature. In these examples, generating the output data may be based at least in part on the weighting value.

Additionally, or alternatively, the process 900 may include generating, based at least in part on another model which may be described herein as a linguistics model, another feature to input into the other model. The other feature may represent a third probability value that the identifier corresponds to a first naming indicator of the first accessory device, and a fourth probability value that the identifier corresponds to a second naming indicator of the second accessory device. In these examples, generating the output data may be based at least in part on inputting the other feature into the second model.

Additionally, or alternatively, the process 900 may include generating, based at least in part on another model which may be described herein as a device-affinity model, another feature to input into the other model. The other feature may represent a first frequency value at which the voice-enabled device is utilized to operate the first accessory device and/or a second frequency value at which the voice-enabled device is utilized to operate the second accessory device. In these examples, generating the output data may be based at least in part on inputting the other feature into the second model.

Additionally, or alternatively, the process 900 may include storing device-control data indicating that the first accessory device was controlled at a first time and determining that the audio data is received at a second time. The process 900 may also include determining that the second time is within a threshold amount of time of the first time and generating, based at least in part on the second time being within the threshold amount of time of the first time, a second feature to input into the second model. In these examples, generating the output data may be based at least in part on inputting the second feature into the second model.

Additionally, or alternatively, the process 900 may include receiving feedback data representing an indication that the target device corresponds to the second accessory device and generating, based at least in part on the feedback data, training data representing the indication as a target attribute. The process 900 may also include determining an association between the target attribute and at least one of the feature or at least a portion of the intent data and generating, based at least in part on the association, a third model to be utilized in place of the second model.

Figure 10:
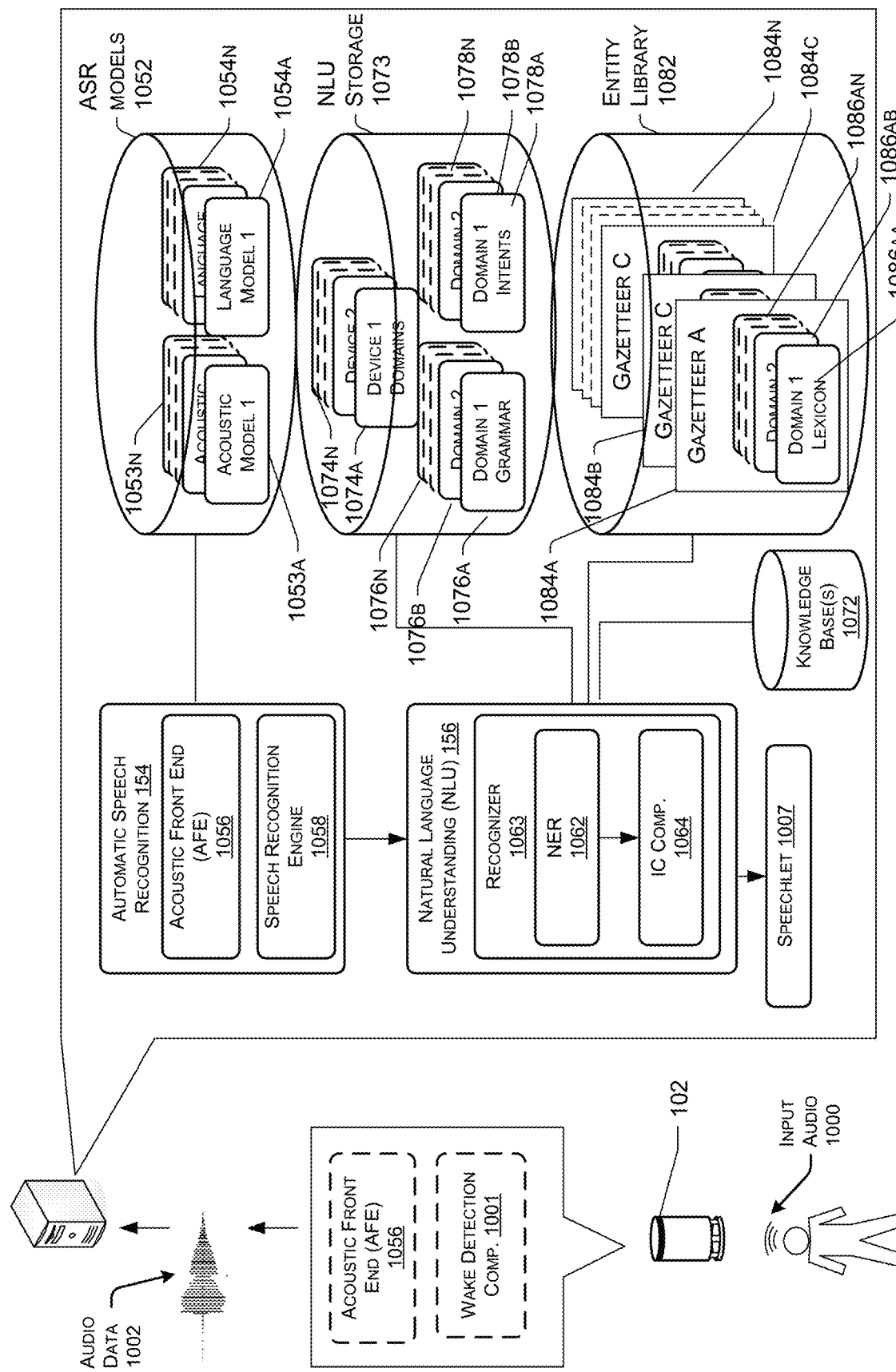
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 110). The various components illustrated may be located on a same or different physical devices. Message between various components illustrated in FIG. 10 may occur directly or across a network 112. An audio capture component, such as a microphone 120 of the device 102, or another device, captures audio 1000 corresponding to a spoken utterance. The device 102, using a wakeword detection component 1001, then processes audio data corresponding to the audio 1000 to determine if a keyword (such as a wakeword) is detected in the audio data. Following detection of a wakeword, the device 102 sends audio data 1002 corresponding to the utterance to the remote system 110 that includes an ASR component 154. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 154 of the remote system 110.

The wakeword detection component 1001 works in conjunction with other components of the user device, for example a microphone to detect keywords in audio 1000. For example, the device may convert audio 1000 into audio data, and process the audio data with the wakeword detection component 1001 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1002 corresponding to input audio 1000 to the remote system 110 for speech processing. Audio data corresponding to that audio may be sent to remote system 110 for routing to a recipient device or may be sent to the remote system 110 for speech processing for interpretation of the included speech (either for purposes of enabling voice-messages and/or for purposes of executing a command in the speech). The audio data 1002 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 110, an ASR component 154 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056) and transmit that information to a server across a network for ASR processing. Feature vectors may arrive at the remote system 110 encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on lights." The wake detection component may identify the wake word, otherwise described as a trigger expression, "Alexa," in the user utterance and may "wake" based on identifying the wake word. Audio data corresponding to the user utterance may be sent to the remote system 110, where the speech recognition engine 1058 may identify, determine, and/or generate text data corresponding to the user utterance, here "turn on lights."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The device performing NLU processing 156 (e.g., server 110) may include various components, including potentially dedicated processor(s), memory, storage, etc. As shown in FIG. 10, an NLU component 156 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084*a*-1084*n*) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 1000) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102) to complete that action.

For example, if a spoken utterance is processed using ASR 154 and outputs the text "turn on lights" the NLU process may determine that the user intended to establish to operate or otherwise turn on one or more devices with a naming indicator of "lights."

The NLU may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "turn on Office Light," "turn on" may be tagged as a command (to activate a device) and "Office Light" may be tagged as the naming identifier of the device with which to activate.

To correctly perform NLU processing of speech input, an NLU process 156 may be configured to determine a "domain" of the utterance so as to determine and narrow down which services offered by the endpoint device (e.g., remote system 110 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 156 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a smart home intent database may link words and phrases such as "turn on," "activate," "on," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on Office Light" is an identified intent, a grammar (1076) framework or frameworks may correspond to sentence structures such as "turn on {Office Light}."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "turn on Office Light," after failing to determine which device to operate, the NER component 1062 may search the domain vocabulary for the phrase "Office Light". In the alternative, generic words may be checked before the gazetteer information, or both may be tried, potentially producing two different results.

The output data from the NLU processing (which may include tagged text, commands, etc.) may then be sent to a speechlet 1007. The destination speechlet 1007 may be determined based on the NLU output. For example, if the NLU output includes a command to send a message, the destination speechlet 1007 may be a message sending application, such as one located on the user device or in a message sending appliance, configured to execute a message sending command. If the NLU output includes a search request, the destination speechlet 1007 may include a search engine processor, such as one located on a search server, configured to execute a search command. After the appropriate command is generated based on the intent of the user, the speechlet 1007 may provide some or all of this information to a text-to-speech (TTS) engine. The TTS engine may then generate an actual audio file for outputting the audio data determined by the speechlet 1007 (e.g., "okay," or "we couldn't find Office Light"). After generating the file (or "audio data"), the TTS engine may provide this data back to the remote system 110.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 110 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 110, as illustrated herein are exemplary, and may be located in a stand-alone device or may be included, in whole or in part, as a component of a larger device or system, may be distributed across a network or multiple devices connected by a network, etc.

Figure 11:
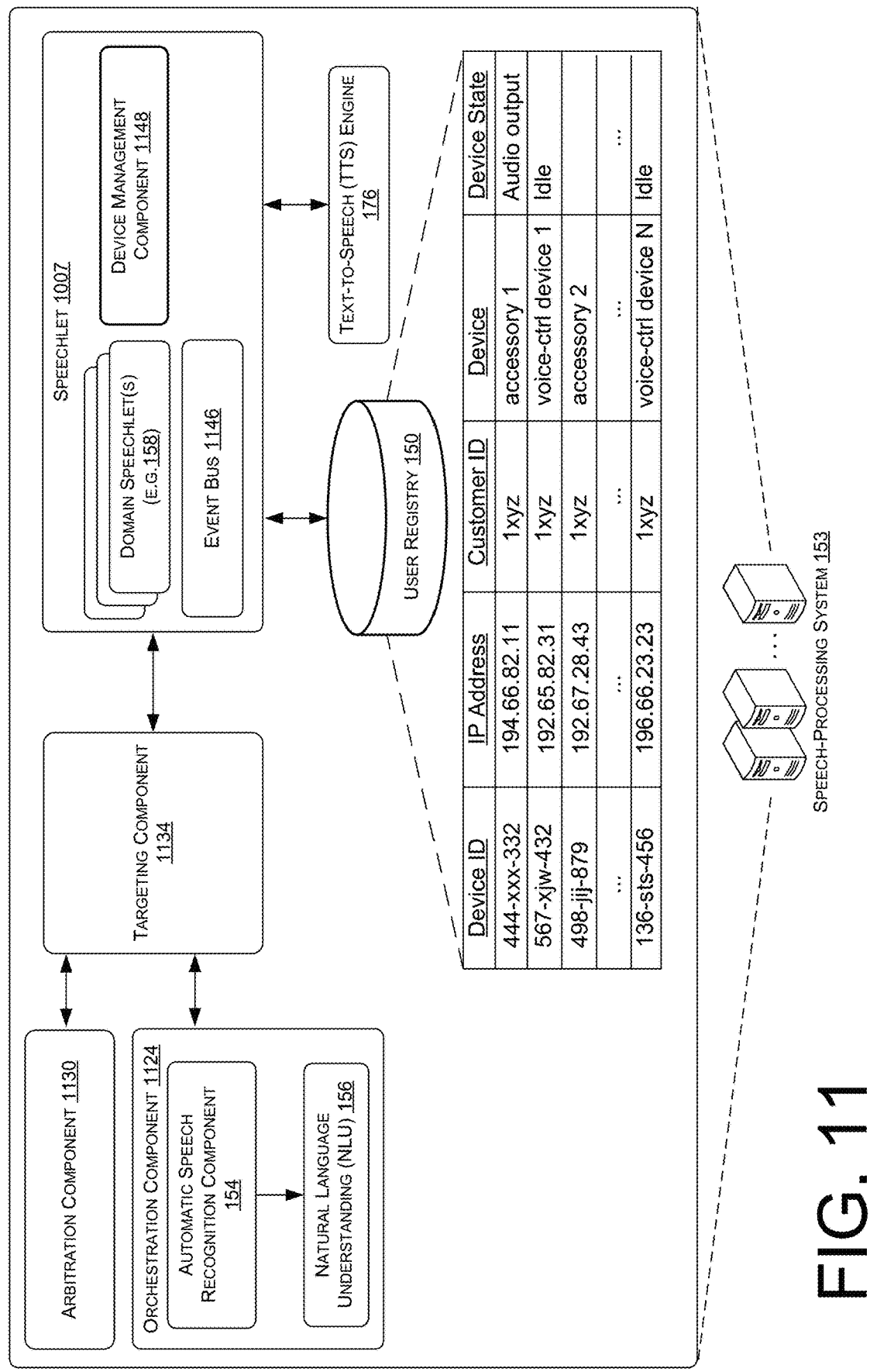
FIG. 11 illustrates a conceptual diagram of components of a speech-processing system for target-device resolution.

FIG. 11 illustrates a conceptual diagram of components of a speech-processing system 153 associating audio output commands with multiple devices, including a speechlet 1007 configured to generate a command that the selected voice-enabled device uses to respond to a user utterance. As used with respect to FIG. 11, a voice-enabled device may include a voice-enabled device 102, such as described with respect to FIG. 1. As illustrated in FIG. 11, the speech-processing system 153, including the orchestration component 1124 comprising the ASR component 154 and the NLU component 156, may be coupled to the targeting component 1134 and provide the targeting component 1134 with the intent determined to be expressed in the user utterance. Further, the arbitration component 1130 may provide the ranked list of devices to the targeting component 1134, as well as device indicators (e.g., IP addresses, devices names, etc.) for one or more of the voice-enabled devices in the ranked list of devices. The targeting component 1134 may then perform techniques to determine a target device (e.g., a device to perform the requested operation), and provide various data to the speechlet 1007. For instance, the targeting component 1134 may provide the speechlet 1007 with various device identifiers of the voice-enabled devices, the determined target device, the determined intent and/or command, etc.

The speechlet 1007 and/or NLU component 156 may determine a domain based on the intent and, based on this determination, route the request corresponding to the audio data to the appropriate domain speechlet, such as the illustrated domain speechlets 158. The domain speechlet 158 may comprise any type of device or group of devices (e.g., hardware device, virtual devices or partitions, server, etc.), and may receive the text data and/or an intent associated with the audio signals and may determine how to respond to the request. For instance, the intent for a command "turn on study light" may be routed to a smart-home speechlet 158, which controls generation of directive data for sending to voice-enabled devices for outputting audio confirming that an accessory device with the naming indicator of "study light" has been activated.

Various types of domain speechlets 158 may be used to determine which devices to send commands to and/or to use in response to a user utterance, as well as the appropriate response and potential additional content (e.g., audio data). For example, the domain speechlets 158 may include a third party skills domain speechlet 158, which may handle intents associated with gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 158 generates the appropriate command, which may be described herein as directive data, based on the intent of the user, and/or provides additional content, such as audio data, to be output by one of the voice-enabled devices, the domain speechlet 158 may provide this information back to the speech system 153, which in turns provides some or all of this information to a text-to-speech (TTS) engine 176. The TTS engine 176 then generates an actual audio file for outputting the second audio data determined by the domain speechlet 158. After generating the file (or "audio data"), the TTS engine 176 may provide this data back to the speech system 153.

The speech system 153 may then publish (i.e., write) some or all of this information to an event bus 1146. That is, the speech system 153 may provide information regarding the initial request (e.g., the speech, the text, the domain/intent, etc.), the response to be provided to the voice-enabled device, or any other information pertinent to the interaction between the voice-enabled device and the speech-processing system 153 to the event bus 1146.

Within the speech-processing system 153, one or more components or services may subscribe to the event bus 1146 so as to receive information regarding interactions between user devices and the speech-processing system 153. In the illustrated example, for instance, the device management component 1148 may subscribe to the event bus 1146 and, thus, may monitor information regarding these interactions. In some examples, monitoring information in the event bus 1146 may comprise messages between various components of the speech-processing system 153. For example, the targeting component 1134 may monitor the event bus 1146 to identify device state data for voice-enabled devices. In some examples, the event bus 1146 may "push" or send indications of events and/or device state data to the targeting component 1134. Additionally, or alternatively, the event bus 1146 may be "pulled" where the targeting component 1134 sends requests to the event bus 1146 to provide an indication of device state data for a voice-enabled device. The event bus 1146 may store indications of the device states for the devices, such as in a database (e.g., user registry 150), and using the stored indications of the device states, send the device state data for voice-enabled devices to the targeting component 1134. Thus, to identify device state data for a device, the targeting component 1134 may send a request to the event bus 1146 (e.g., event component) to provide an indication of the device state data associated with a device, and receive, from the event bus 1146, the device state data that was requested.

The device management component 1148 functions to monitor information published to the event bus 1146 and identify events that may trigger action. For instance, the device management component 1148 may identify (e.g., via filtering) those events that: (i) come from voice-enabled devices that are associated with secondary device(s) (e.g., have secondary devices in their spaces such as televisions, personal computing devices, accessory devices, etc.), and (ii) are associated with supplemental content (e.g., image data, video data, etc.). The device management component 1148 may reference the user registry 150 to determine which voice-enabled devices are associated with secondary devices, as well as determine device types, states, and other capabilities of these secondary devices. For instance, the device management component 1148 may determine, from the information published to the event bus 1146, an identifier associated with the voice-enabled device making the corresponding request or the voice-enabled device selected to respond to or act upon the user utterance. The device management component 1148 may use this identifier to identify, from the user registry 150, a user account associated with the voice-enabled device. The device management component 1148 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1148 may determine whether a particular event identified is associated with supplemental content. That is, the device management component 1148 may write, to a datastore, indications of which types of events and/or which primary content or responses are associated with supplemental content. In some instances, the speech-processing system 153 may provide access to third-party developers to allow the developers to register supplemental content for output on secondary devices for particular events and/or primary content. For example, if a voice-enabled device is to output that the weather will include thunder and lightning, the device management component 1148 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1148 may store an association between the primary response or content (e.g., outputting of information regarding the world's largest mammal) and corresponding supplemental content (e.g., the audio data, image data, or the like). In some instances, the device management component 1148 may also indicate which types of secondary devices are to output which supplemental content. For instance, in the instant example, the device management component 1148 may store an indication that secondary devices of a class type "tablet" are to output a picture of a blue whale. In these and other instances, meanwhile, the device management component 1148 may store the supplemental content in association with secondary-device capabilities (e.g., devices with speakers output the audio commentary, devices with screens output the image, etc.).

The device management component 1148 may also determine how to transmit response and/or supplement content (and/or information acquiring the content) to the voice-enabled devices and/or the secondary devices. To make this determination, the device management component 1148 may determine a device type of the voice-enabled devices and/or secondary devices, capabilities of the device(s), or the like, potentially as stored in the user registry 150. In some instances, the device management component 1148 may determine that a particular device is able to communicate directly with the speech-processing system 153 (e.g., over WiFi) and, thus, the device management component 1148 may provide the response and/or content directly over a network 112 to the secondary device (potentially via the speech system 153). In another example, the device management component 1148 may determine that a particular secondary device is unable to communicate directly with the speech-processing system 153, but instead is configured to communicate with a voice-enabled device in its space over short-range wireless networks. As such, the device management component 1148 may provide the supplement content (or information) to the speech system 153, which in turn may send this to the voice-enabled device, which may send the information over a short-range network to the secondary device.

The speech-processing system 153 may further include the user registry 150 that includes data regarding user profiles as described herein. The user registry 150 may be located part of, or proximate to, the speech-processing system 153, or may otherwise be in message with various components, for example over the network 112. The user registry 150 may include a variety of information related to individual users, accounts, etc. that interact with the voice-enabled devices, and the speech-processing system 153. For illustration, the user registry 150 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 150 may store indications of associations between various voice-enabled devices and/or secondary device, such as virtual clusters of devices, states of devices, and associations between devices and audio-session queues. The user registry 150 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 1007 and/or the domain speechlets 158 may determine, based on the stored device states in the user registry 150, a current device state of the voice-enabled devices. Rather than receiving device states for the voice-enabled devices, in metadata, the device states may already have been determined or received and stored in the user registry 150. Further, the user registry 150 may provide indications of various permission levels depending on the user. As an example, the speech system 153 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1146 may publish different events which indicate device states to various entities or components that subscribe to the event bus 1146. For instance, if an event of "play Song A" occurs for a voice-enabled device, the event bus 1146 may publish the indication of this event, and thus the device state of the voice-enabled device from which the audio data was received may be determined. Thus, various components, such as the targeting component 1134, may be provided with indications of the various device states via the event bus 1146. The event bus 1146 may further store and/or update device states for the voice-enabled devices in the user registry 150. The components of the speech-processing system 153 may query the user registry 150 to determine device states.

A particular user profile may include a variety of data that may be used by the system 110. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 12:
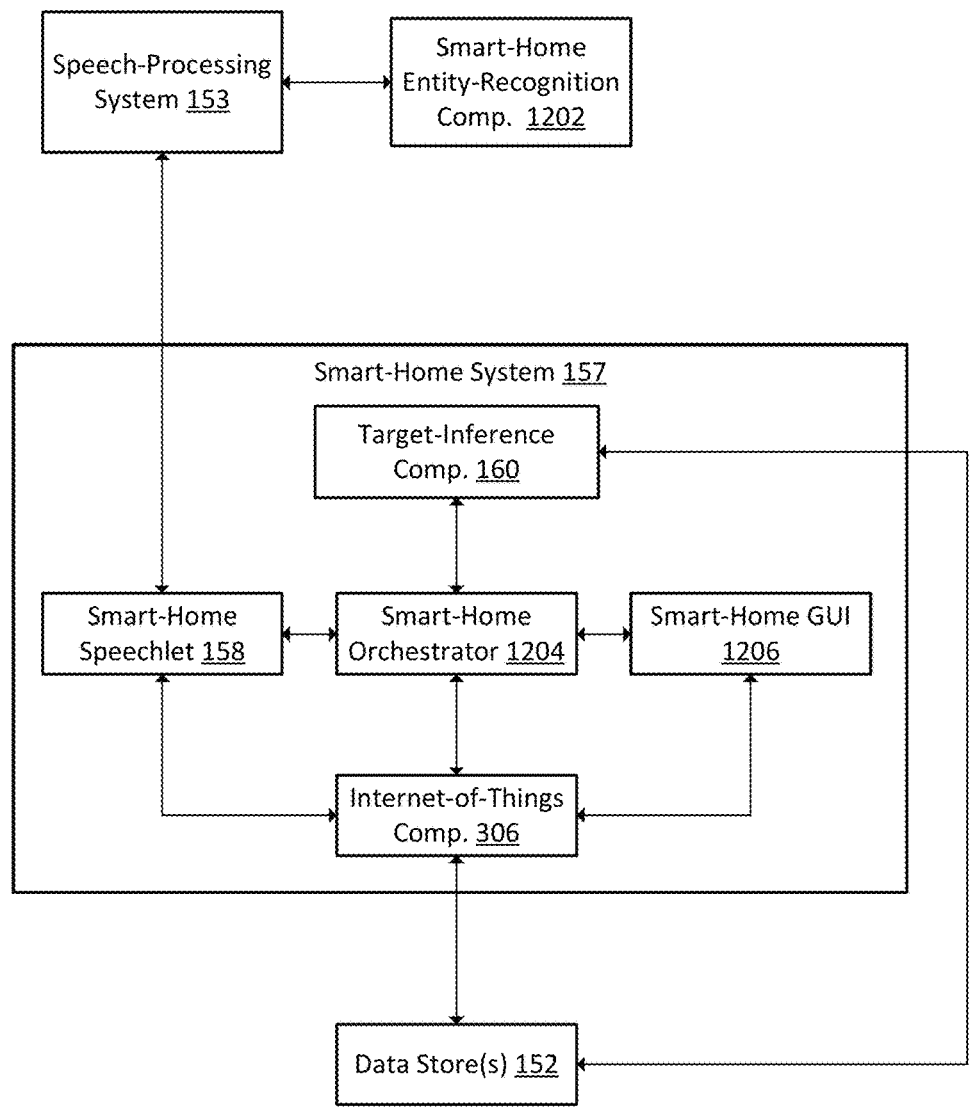
FIG. 12 illustrates a conceptual diagram of a smart-home system utilized for target-device resolution.

FIG. 12 illustrates a conceptual diagram of a smart-home system 157 utilized for target-device resolution. The smart-home system 157 may include components described above with respect to FIG. 1, such as a smart-home speechlet 157, and a target-inference component 160. The smart-home system 157 may also be configured to send data to and receive data from other components of a remote system and/or one or more other systems. For example, the other components may include a speech-processing system 153, and one or more data stores 152. The smart-home system 157 may also include components such as a smart-home orchestrator 1204, a smart-home graphical user interface (GUI) 1206, and/or an internet-of-things component 306. Each of these components will be described in detail below.

As described herein, a user may interact with an accessory device using tactile input to the accessory device, voice input to a voice-enabled device, and/or input to an application residing on and/or accessible to a personal device. When a user interacts with an accessory device using voice input to a voice-enabled device, audio data representing user utterances may be received at the speech-processing system 153. The speech-processing system 153 may analyze the audio data and/or corresponding text data generated, by way of example, using an ASR component, to determine that the user utterance represents an intent to control an accessory device. To determine the intent associated with the user utterance, the speech-processing system 153 may utilize a smart-home entity-recognition component 1202, which may be utilized to inform one or more intents available to the speech-processing system 153 and/or to inform one or more values associated with the intents. For example, the user utterance of "turn off bedroom lights" may be analyzed by the speech-recognition component 153. The smart-home entity-recognition component 1202 may train or otherwise provide data to the speech-processing system 153 indicating intents associated with operation of accessory devices, such as "turn on," "turn off," "activate," "deactivate," "dim," "brighten," "lock," "unlock," etc. The smart-home entity-recognition component 1202 may additionally, or alternatively, provide data indicating identifiers and/or payloads associated with such intents, such as "light," "lights," "lock," "outlet," "switch," etc. It should be understood that while the smart-home entity-recognition component 1202 is depicted in FIG. 12 as being a component separate from the smart-home system 157, the smart-home entity-recognition component 1202 may be a component of the smart-home system 157.

The speech-processing system 153 may be configured to determine that the intent corresponds to an operation configured to be performed by the smart-home system 157, and based at least in part on such a determination, the speech-processing system 153 may provide the intent data and/or other data associated with the request to the smart-home speechlet 158 of the smart-home system 157. The smart-home orchestrator 1204 may be configured to receive data indicating that the smart-home speechlet 158 has been invoked to determine a directive to be performed with respect to an accessory device and may query one or more other components of the smart-home system 157 to effectuate the request. For example, the smart-home orchestrator 1204 may query the internet-of-things component 306 to identify naming indicators associated with accessory devices for a particular user account. The internet-of-things component 306 may query the data store(s) 152 and/or the user account for such naming indicators. The internet-of-things component 306 may return the naming indicators to the smart-home speechlet 158, which may identify which naming indicator corresponds to the identified target device from the user utterance.

In other examples, such as when the smart-home speechlet 158 and/or the internet-of-things component 306 cannot determine which accessory device corresponds to the identified target device, the smart-home orchestrator 1204 may query the target-inference component 160 to perform target-device resolution as described herein. For example, the target-inference component 160 may utilize one or more models as described herein to generate output data representing a ranked list of accessory devices. This information may be utilized to select the highest-ranking accessory device as the identified target device from the user utterance.

Additionally, or alternatively, as mentioned above, the accessory devices may be operated based at least in part on input data received from an application residing on and/or accessible to a personal device, such as a mobile phone and/or computer. The smart-home GUI 1206 may be utilized to receive the input data and/or to display recommendations and/or requests to a user. For example, the smart-home GUI 1206 may be utilized to display a request to confirm that a selected accessory device is the desired device to be acted upon.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing instructions that, when executed by the one or more processors, cause the one or more processors to perform operations comprising:
storing first data representing a first naming indicator associated with a first device;
storing second data representing second naming indicator associated with a second device;
receiving, from a voice-enabled device, third data representing a user utterance including a device identifier of a target device to operate;
generating, based at least in part on the third data, fourth data representing a first probability value that the device identifier is semantically similar to at least one of the first naming indicator or the second naming indicator; and
determining, based at least in part on the fourth data, that the target device is more likely to correspond to the first device than the second device.

2. The system of claim 1, the operations further comprising:
determining a first space in which the first device is located;
identifying the first naming indicator based at least in part on the first space;
determining a second space in which the second device is located; and
identifying the second naming indicator based at least in part on the second space.

3. The system of claim 1, the operations further comprising:
determining that the first device is associated with a device group having a third naming indicator;
generating fifth data representing a second probability value that the device identifier is semantically similar to the third naming indicator; and
wherein determining that the target device is more likely to correspond to the first device than the second device comprises determining that the target device is more likely to correspond to the first device than the second device based at least in part on the fifth data.

4. The system of claim 1, the operations further comprising:
determining that the voice-enabled device is associated with a third naming indicator;
determining that the third naming indicator includes a common word with the first naming indicator; and
wherein determining that the target device is more likely to correspond to the first device than the second device comprises determining that the target device is more likely to correspond to the first device than the second device based at least in part on the third naming indicator having the common word.

5. The system of claim 1, the operations further comprising:
determining that the device identifier from the third data indicates a device type of the target device;
determining that the first naming indicator includes a reference to the device type; and wherein determining that the target device is more likely to correspond to the first device than the second device comprises determining that the target device is more likely to correspond to the first device than the second device based at least in part on the first naming indicator including the reference to the device type.

6. The system of claim 1, wherein the third data is received at a time of day, and the operations further comprise:
generating fifth data representing a second probability value that the first device is operated during a time range that includes the time of day; and
wherein determining that the target device is more likely to correspond to the first device than the second device comprises determining that the target device is more likely to correspond to the first device than the second device based at least in part on the fifth data.

7. The system of claim 1, the operations further comprising:
storing fifth data indicating that the first device was previously controlled at a first time;
determining that the third data is received at a second time;
determining that the second time is within a threshold amount of time of the first time; and
wherein determining that the target device is more likely to correspond to the first device than the second device comprises determining that the target device is more likely to correspond to the first device than the second device based at least in part on the second time being within the threshold amount of time of the first time.

8. The system of claim 1, the operations further comprising:
storing fifth data indicating a first number of times that the voice-enabled device has been utilized to operate the first device;
storing sixth data indicating a second number of times that the voice-enabled device has been utilized to operate the second device; and
wherein determining that the target device is more likely to correspond to the first device than the second device comprises determining that the target device is more likely to correspond to the first device than the second device based at least in part on the fifth data and the sixth data.

9. The system of claim 1, wherein the third data comprises audio data, and the operations further comprise:
determining a characteristic of the audio data;
determining that historical commands to operate the first device included the characteristic; and
wherein determining that the target device is more likely to correspond to the first device than the second device comprises determining that the target device is more likely to correspond to the first device than the second device based at least in part on the historical commands including the characteristic.

10. The system of claim 1, the operations further comprising:
determining, based at least in part on fifth data indicating historical usage of the voice-enabled device to operate target devices, that the voice-enabled device is historically utilized to cause the first device to perform commands having a command type;
determining that the third data indicates the command type; and
wherein determining that the target device is more likely to correspond to the first device than the second device comprises determining that the target device is more likely to correspond to the first device than the second device based at least in part on the third data indicating the command type.

11. A method, comprising:
storing first data representing historical usage of a voice-enabled device to cause a first device to perform first commands;
storing second data representing historical usage of the voice-enabled device to cause a second device to perform second commands;
receiving, from the voice-enabled device, third data representing a user utterance to operate a target device; and
determining, based at least in part on the first data and the second data, that the target device is more likely to correspond to the first device than the second device.

12. The method of claim 11, further comprising:
storing fourth data representing a first naming indicator associated with the first device;
storing fifth data representing a second naming indicator associated with the second device;
generating, based at least in part on the fourth data and the fifth data, sixth data representing a probability value that a device identifier from the third data is semantically similar to at least one of the first naming indicator or the second naming indicator; and
wherein determining that the target device is more likely to correspond to the first device than the second device comprises determining that the target device is more likely to correspond to the first device than the second device based at least in part on the sixth data.

13. The method of claim 11, further comprising:
determining a first space in which the first device is located;
identifying a naming indicator of the first device based at least in part on the first space;
determining that a device identifier from the third data is semantically similar to the naming indicator; and
wherein determining that the target device is more likely to correspond to the first device than the second device comprises determining that the target device is more likely to correspond to the first device than the second device based at least in part on the device identifier being semantically similar to the naming indicator.

14. The method of claim 11, further comprising:
determining that the first device is associated with a device group having a naming indicator;
determining that a device identifier from the third data is semantically similar to the naming indicator; and
wherein determining that the target device is more likely to correspond to the first device than the second device comprises determining that the target device is more likely to correspond to the first device than the second device based at least in part on the device identifier being semantically similar to the naming indicator.

15. The method of claim 11, further comprising:
determining that the voice-enabled device is associated with a naming indicator;
determining that a device identifier from the third data is semantically similar to the naming indicator; and
wherein determining that the target device is more likely to correspond to the first device than the second device comprises determining that the target device is more likely to correspond to the first device than the second device based at least in part on the device identifier being semantically similar to the naming indicator.

16. The method of claim 11, further comprising:
determining that a device identifier from the third data indicates a device type of the target device;
determining that a naming indicator of the first device includes a reference to the device type; and
wherein determining that the target device is more likely to correspond to the first device than the second device comprises determining that the target device is more likely to correspond to the first device than the second device based at least in part on the naming indicator including the reference to the device type.

17. The method of claim 11, wherein the third data is received at a time of day, and the method further comprises:
generating fourth data representing a probability value that the first device is operated during a time range that includes the time of day; and
wherein determining that the target device is more likely to correspond to the first device than the second device comprises determining that the target device is more likely to correspond to the first device than the second device based at least in part on the fourth data.

18. The method of claim 11, further comprising:
storing fourth data indicating that the first device was controlled at a first time;
determining that the third data is received at a second time;
determining that the second time is within a threshold amount of time of the first time; and
wherein determining that the target device is more likely to correspond to the first device than the second device comprises determining that the target device is more likely to correspond to the first device than the second device based at least in part on the second time being within the threshold amount of time of the first time.

19. The method of claim 11, wherein the third data comprises audio data, and the method further comprises:
determining a characteristic of the audio data;
determining that historical commands to operate the first device included the characteristic; and
wherein determining that the target device is more likely to correspond to the first device than the second device comprises determining that the target device is more likely to correspond to the first device than the second device based at least in part on the historical commands including the characteristic.

20. The method of claim 11, wherein the first data indicates the voice-enabled device is historically utilized to cause the first device to perform commands having a command type;
determining that the third data indicates the command type; and
wherein determining that the target device is more likely to correspond to the first device than the second device comprises determining that the target device is more likely to correspond to the first device than the second device based at least in part on the third data indicating the command type.

* * * * *